United States Patent
Bektchiev et al.

(10) Patent No.: US 9,876,635 B2
(45) Date of Patent: Jan. 23, 2018

(54) SECURITY RELIANCE SCORING FOR CRYPTOGRAPHIC MATERIAL AND PROCESSES

(71) Applicant: Venafi, Inc., Salt Lake City, UT (US)

(72) Inventors: Deyan Bektchiev, Mountain View, CA (US); Dan Elarde, Sunnyvale, CA (US); Gavin Hill, Fort Worth, TX (US); Remo Ronca, Salt Lake City, UT (US); Matthew Woods, Cuppertino, CA (US)

(73) Assignee: Venafi, Inc., Salt Lake City, UT (US)

( * ) Notice: Subject to any disclaimer, the term of this patent is extended or adjusted under 35 U.S.C. 154(b) by 143 days.

(21) Appl. No.: 14/802,502

(22) Filed: Jul. 17, 2015

(65) Prior Publication Data

US 2017/0061129 A1    Mar. 2, 2017

Related U.S. Application Data

(60) Provisional application No. 62/025,859, filed on Jul. 17, 2014.

(51) Int. Cl.
*H04L 9/00* (2006.01)
*G06F 11/34* (2006.01)

(52) U.S. Cl.
CPC ............ *H04L 9/00* (2013.01); *G06F 11/3447* (2013.01); *G06F 11/3452* (2013.01)

(58) Field of Classification Search
CPC ......................... G06F 11/3452; G06F 11/3447
See application file for complete search history.

(56) References Cited

U.S. PATENT DOCUMENTS 8,095,488 B1 *   1/2012   Satish .................... G06N 7/005
                                                        706/12
2014/0317409 A1   10/2014  Bartok et al.

OTHER PUBLICATIONS

Casola et al.; A policy-based methodology for security evaluation: A Security Metric for Public Key Infrastructures; 2007; Journal of Computer Security; vol. 15, Iss. 2, pp. 197-229 (34 pages).*
Wang et al.; Automatic Misconfiguration Troubleshooting with PeerPressure; 2004; Retrieved from the Internet <URL: https://www.microsoft.com/en-us/research/wp-content/uploads/2004/12/peerpressure.pdf>; pp. 1-13.*

(Continued)

*Primary Examiner* — Saleh Najjar
*Assistant Examiner* — Michael Chao
(74) *Attorney, Agent, or Firm* — Schwegman Lundberg & Woessner, P.A.

(57) ABSTRACT

In representative embodiments, a system and method to calculate a security reliance score is illustrated. The security reliance score is calculated from an aggregation of property sub-scores. The property sub-scores are, in turn, based on scores for attributes that make up the properties. A learning model is employed to adjust scores over time based on collected information. Additionally, statistical sampling can adjust scores based on context, including geo-location context. Security reliance scores can be used to identify weaknesses that should be fixed in cryptographic material and/or configurations. The system can also make recommendations for changes that will have the biggest impact on security reliance scores. Additional uses are also identified.

20 Claims, 10 Drawing Sheets

(56) References Cited

OTHER PUBLICATIONS

"Advanced Encryption Standard (AES)", Federal Information Processing Standards Publication 197, (Nov. 26, 2001), 51 pgs.
"Algorithms, Key Sizes and Parameters Report", Enisa:2013 Recommendations, Version 1.0, (2013), 96 pgs.
"Baseline Requirements Certificate Policy for the Issuance and Management of Publicly-Trusted Certificates", CA/Browser Forum, Version 1.3,0, (Apr. 16, 2015), 53 pgs.
"Digital Signature Standard (DSS)", Federal Information Processing Standards Publication 186-3, (Jun. 2009), 131 pgs.
"Guidelines for the Issuance and Management of Extended Validation Certificates", CA/Browser Forum, Version 1.5.5, (Copyright: 2007-2015), 50 pgs.
"Secure Hash Standard (SHS)", Federal Information Processing Standards Publication 180-3, (Oct. 2008), 33 pgs.
"The Keyed-Hash Message Authentication Code (HMAC)", Federal Information Processing Standards Publication 198, (Mar. 6, 2002), 21 pgs.
Arends, R., et al., "DNS Security Introduction and Requirements", Network Working Group: Request for Comments: 4033, (Mar. 2005), 19 pgs.
Barker, Elaine, et al., "Recommendation for Key Management, Part 1: General (Revised)", NIST Special Publication 800-57 Part 1 (Revised), (Mar. 2007), 143 pgs.
Barker, Elaine, et al., "Recommendation for Pair-Wise Key Establishment Schemes Using Discrete Logarithm Cryptography", NIST Special Publication 800-56A, Revision 2, (May 2013), 138 pgs.
Barker, Elaine, et al., "Transitions: Recommendation for Transitioning the Use of Cryptographic Algorithms and Key Lengths", NIST Special Publication 800-131A, (Nov. 2015), 28 pgs.
Coclin, Dean, "What Are the Different Types of SSL Certificates?", CA Security Council, [Online]. Retrieved from the Internet: <URL: https://casecurity.org/2013/08/07/what-are-the-different-types-of-ssl-certificates/, (Aug. 7, 2013), 5 pgs.
Cooper, D., "Internet X.509 Public Key Infrastructure Certificate and Certificate Revocation List (CRL) Profile", Network Working Group: Request for Comments: 5280, (May 2008), 151 pgs.
Dierks, T., et al., "The TLS Protocol, Version 1.0", Network Working Group: Request for Comments: 2246, (Jan. 1999), 69 pgs.
Dierks, T., et al., "The Transport Layer Security (TLS) Protocol Version 1.1", Network Working Group: Request for Comments: 4346, (Apr. 2006), 76 pgs.
Dierks, T., et al., "The Transport Layer Security (TLS) Protocol Version 1.2", Network Working Group: Request for Comments: 5246, (Aug. 2008), 104 pgs.
Dworkin, Morris, "Recommendation for Block Cipher Modes of Operation: Galois/Counter Mode (GCM) and GMAC", NIST Special Publication 800-38D, (Nov. 2007), 39 pgs.
Dworkin, Morris, "Recommendation for Block Cipher Modes of Operation: Methods and Techniques", NIST Special Publication 800-38A, National Institute of Standards and Technology: Technology Administration: U.S. Department of Commerce, (2001), 66 pgs.
Eastlake, D., "Transport Layer Security (TLS) Extensions: Extension Definitions", Internet Engineering Task Force: Request for Comments: 6066, (Jan. 2011), 25 pgs.
Freier, A., et al., "The Secure Sockets Layer (SSL) Protocol Version 3.0", Internet Engineering Task Force: Request for Comments: 6101, (Aug. 2011), 67 pgs.
Hodges, J., et al., "HTTP Strict Transport Security (HSTS)", Internet Engineering Task Force: Request for Comments: 6797, (Nov. 2012), 46 pgs.

Hoffman, P., et al., "The DNS-Based Authentication of Named Entities (DANE) Transport Layer Security (TLS) Protocol: TLSA", Internet Engineering Task Force: Request for Comments: 6698, (Aug. 2012), 37 pgs.
Kent, S., et al., "Security Architecture for the Internet Protocol", Network Working Group: Request for Comments: 4301, (Dec. 2005), 101 pgs.
Laurie, B., et al., "Certificate Transparency", Internet Engineering Task Force: Request for Comments: 6962, (Jun. 2013), 27 pgs.
Leontiev, S., et al., "Using the GOST R 34.10-94, GOST R 34.10-2001, and GOST R 34.11-94 Algorithms with the Internet X.509 Public Key Infrastructure Certificate and CRL Profile", Network Working Group: Request for Comments: 4491, (May 2006), 20 pgs.
Mockapetris, P., "Domain Names—Concepts and Facilities", Network Working Group: Request for Comments: 1034, (Nov. 1987), 48 pgs.
Pettersen, Y., "The Transport Layer Security (TLS) Multiple Certificate Status Request Extension", Internet Engineering Task Force: Request for Comments: 6961, (Jun. 2013), 10 pgs.
Polk, Tim, "Guidelines for the Selection, Configuration, and Use of Transport Layer Security (TLS) Implementations", NIST Special Publication 800-52 Revision 1, (Apr. 2014), 67 pgs.
Polk, W., et al., "Algorithms and Identifiers for the Internet X.509 Public Key Infrastructure Certificate and Certificate Revocation List (CRL) Profile", Network Working Group: Request for Comments: 3279, (Apr. 2002), 24 pgs.
Rekhter, Y., et al., "A Border Gateway Protocol 4 (BGP-4)", Network Working Group: Request for Comments: 4271, (Jan. 2006), 104 pgs.
Rescorla, E., et al., "Transport Layer Security (TLS) Renegotiation Indication Extension", Internet Engineering Task Force: Request for Comments: 5746, (Feb. 2010), 15 pgs.
Rivest, R. L, et al., "A Method for Obtaining Digital Signatures and Public—Key Cryptosystems", Communication of the AMC, 21(2), (Feb. 1978), 120-126.
Rivest, R. L., "The MD5 Message-Digest Algorithm", Network Working Group: Request for Comments: 1321, (Apr. 1992), 22.
Saint-Andre, P., et al., "Representation and Verification of Domain-Based Application Service Identity within Internet Public Key Infrastructure Using X.509 (PKIX) Certificates in the Context of Transport Layer Security (TLS)", Internet Engineering Task Force: Request for Comments: 6125, (Mar. 2011), 57 pgs.
Santesson, S., et al, "X.509 Internet Public Key Infrastructure Online Certificate Status Protocol—OCSP", Internet Engineering Task Force: Request for Comments: 6960, (Jun. 2013), 41 pgs.
Schaad. J., et al., "Additional Algorithms and Identifiers for RSA Cryptography for use in the Internet X.509 Public Key Infrastructure Certificate and Certificate Revocation List (CRL) Profile", Network Working Group: Request for Comments: 4055, (Jun. 2005), 22 pgs.
Seo, Karen, et al., "Public-Key Infrastructure for the Secure Border Gateway Protocol (S-BGP)", Proceedings DARPA Information Survivability Conference & Exposition II, vol. 1, (2001), 239-253.
Sheffer, Y., et al., "Summarizing Known Attacks on Transport Layer Security (TLS) and Datagram TLS (DTLS)Summarizing Known Attacks on Transport Layer Security (TLS) and Datagram TLS (DTLS)", Internet Engineering Task Force: Request for Comments: 7457, (Feb. 2015), 13 pgs.
Turner, S., et al., "Prohibiting Secure Sockets Layer (SSL) Version 2.0", Internet Engineering Task Force: Request for Comments: 6176, (Mar. 2011), 4 pgs.
Ylonen, T, et al., "The Secure Shell (SSH) Protocol Architecture", Network Working Group: Request for Comments: 4251, (Jan. 2006), 26 pgs.

\* cited by examiner

SECURITY RELIANCE SCORING FOR CRYPTOGRAPHIC MATERIAL AND PROCESSES

CROSS RELATED TO RELATED APPLICATIONS

This application claims the benefit of priority to U.S. Provisional Application Ser. No. 62/025,859, filed Jul. 17, 2014, the content of which is hereby incorporated in its entirety.

FIELD

This application relates generally to assigning a metric of security reliance, trustworthiness, and reliability to cryptographic material as well as protocol, system, and process configurations resulting in a score that reflects the evaluation of collected and correlated security-relevant aspects and criteria.

BACKGROUND

Assessing vulnerabilities related to and the credibility of cryptographic material in systems is a difficult problem. Many solutions attempt to evaluate various aspects of a system or protocols in isolation to identify whether vulnerabilities exist. However, aspects evaluated in isolation do not always provide a good understanding of the security or trustworthiness of a system or process.

DETAILED DESCRIPTION

Figure 1:
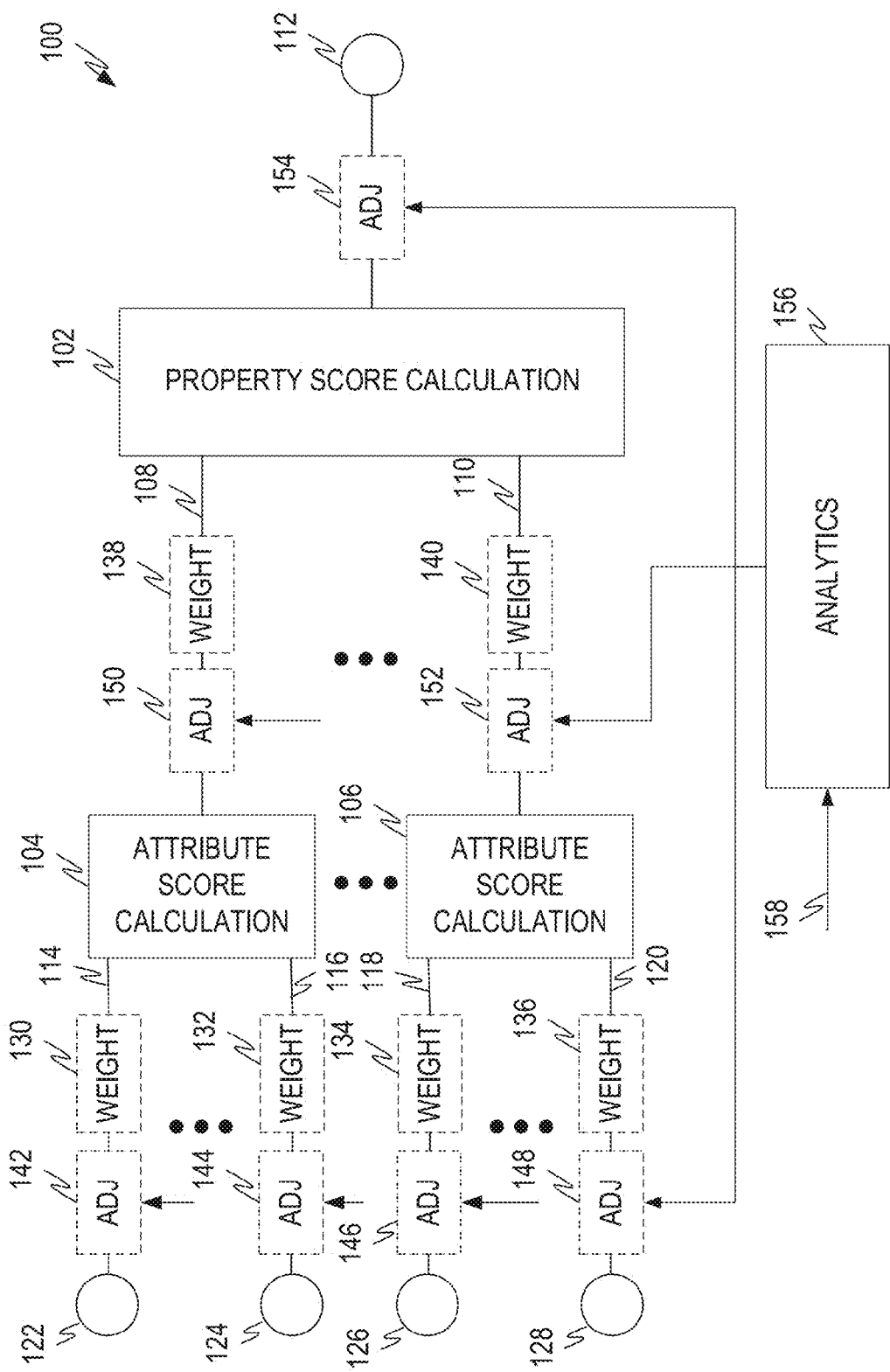
FIG. 1 illustrates an example diagram for calculating a security reliance score.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

This disclosure describes systems and methods to help assess the security reliance, trustworthiness, and reliability of cryptographic material. In one embodiment, a system gathers information from a system, group of systems, company and so forth and uses the information to calculate a security reliance score based on the cryptographic material and the context in which it is used. Collection and consideration of such a large body of data cannot be performed by a human and allows the system to evaluate some unique aspects of both the cryptographic material and the context in which it is used that are simply not possible in more manual evaluations. Furthermore, the system employs learning models, statistical analysis and other aspects that simultaneously account for an ever changing environment and produce results that are not possible when similar data is manually evaluated. As used herein, cryptographic material is a broad term used to encompass material used in a security context and includes material used with a cryptographic algorithm such as cryptographic keys, certificates and so forth.

In some embodiments, the security reliance score can be used as an indication of the vulnerability of systems and protocols applying the evaluated cryptographic material. To help with this, the security reliance score is mapped to a vulnerability scale in some embodiments. The score's metric accounts for various factors, including weighted, autonomous or interdependent factors such as known vulnerabilities; compliance to standards, policies, and best practices; geographic locations and boundaries; and normative deviations through statistical analysis, extrapolation, and heuristic contingencies. In some embodiments, the scoring is further dynamically adjusted to identify the trustworthiness of a particular system, its cryptographic material, and the usage of its cryptographic material in response to learned patterns in incoming data and a dynamic and ever changing environment.

Security reliance scores are calculated by evaluating various properties and attributes of cryptographic material and the context in which the cryptographic material is used. Individual scores for attributes can be aggregated into a property score and property scores can be aggregated into an overall security reliance score for the cryptographic material under consideration. Scores for cryptographic material can be further aggregated to evaluate an overall system, cluster of systems, site, subsidiary, company, vertical and so forth.

Initial values for the scores are determined and algorithms employed that modify the scores over time based on various factors and changes that occur. Learning algorithms, pattern recognition algorithms, statistical sampling methods and so forth are employed in various embodiments as outlined in greater detail below.

Security reliance scores can be used in a variety of contexts. In one embodiment, security reliance scores are used by others to determine whether and to what extent to trust a system or other entity. In other embodiments, the system can identify which of the various factors used in generating the security reliance score would have the most impact on the security reliance score, thus assisting and directing administrators or others striving for an improvement to evaluate the impact of changes within a system, site, company and so forth. In still other embodiments, security reliance scores from different entities can be compared to determine a relative accepted normative baseline. For example, companies within a vertical industry can be compared to ascertain compliance with a normative minimum accepted standard amongst peers and to identify positive and negative outliers form such norm. Other uses for the security reliance scores also exist.

Acronym Glossary

The following is an acronym glossary along with relevant specifications that define and/or discuss the associated acronym definition, as appropriate.

2TDEA Two-key Triple Data Encryption Algorithm (NIST SP-800-57, Part I)
3TDEA Three-key Triple Data Encryption Algorithm (NIST SP-800-57, Part I)
AES Advanced Encryption Standard (FIPS 197)
AIA Authority Information Access (RFC 5280)
ANSI American National Standards Institute
BGP Border Gateway Protocol (RFC 4271)
CA Certification Authority (NIST SP-800-57, Part I, Glossary)
CBC Cipher Block Chaining (NIST SP-800-38A)
CDP CRL Distribution Point (RFC 5280)
CRL Certificate Revocation List (RFC 5280)
DANE DNS-based Authentication of Named Entities (RFC 6698)
DH The FFC Diffie-Hellman key-agreement primitive (NIST SP-800-56A Revision 2, Glossary).
DNSSEC Domain Name System Security Extensions (RFC 4033)
DSA Digital Signature Algorithm (FIPS 186-3)
DV Domain-vetted X.509 TLS server certificates.
EC Elliptic Curve (NIST SP-800-56A Revision 2, Glossary).
ECC Elliptic Curve Cryptography, the public-key cryptographic methods using operations in an elliptic curve group (NIST SP-800-56A Revision 2, Glossary).
ECDH The ECC Diffie-Hellman key-agreement primitive.
ECDHE ECDH based on an ephemeral key pair. An ephemeral key pair is a key pair, consisting of a public key (i.e., an ephemeral public key) and a private key (i.e., an ephemeral private key) that is intended for a short period of use (NIST SP-800-56A Revision 2, Glossary).
ENISA European Network and Information Security Agency
EV X.509 TLS server certificates complying with "Guidelines For The Issuance And Management Of Extended Validation Certificates, v.1.5.5,", 2015, CA/Browser Forum,
FFC Finite Field Cryptography, the public-key cryptographic methods using operations in a multiplicative group of a finite field (NIST SP-800-56A Revision 2, Glossary)
FIPS Federal Information Processing Standards Publications
GCM Galois/Counter Mode (NIST SP-800-38D)
HMAC Keyed-Hash Message Authentication Code (FIPS 198)
HSTS HTTP Strict Transport Security (RFC 6797)
IETF Internet Engineering Task Force.
IP Sec IP Security (RFC 4301)
ITU International Telecommunication Union
MD5 Message-Digest algorithm 5 (RFC 1321)
NIST National Institute of Standards and Technology OCSP Online Certificate Status Protocol (RFC 6960)
OV Organization-vetted X.509 TLS server certificates.
PFS Perfect Forward Secrecy
PKI Public-Key Infrastructure (NIST SP-800-57, Part I, Glossary)
RFC Request for comment, see http://www.ietf.org/rfc.html. RFCs are identified by a number, such as RFC 4346 or RFC 6066.
RSA Rivest, Shamir, Adelman (an algorithm) (R. L. Rivest, A. Shamir, and L. Adleman, "A Method for Obtaining Digital Signatures and Public-key Cryptosystems," Communications of the ACM, 21, 1978, ACM, pp. 120-126.)
S-BGP Secure Border Gateway Protocol (Seo, K.; Lynn, C.; Kent, S., "Public-key infrastructure for the Secure Border Gateway Protocol (S-BGP)," DARPA Information Survivability Conference & Exposition II, 2001. DISCEX '01. Proceedings, vol. 1, pp. 239-253)
SCT Signed Certificate Timestamp (RFC 6962)
SHA-1 Secure Hash Algorithm (FIPS 180-3)
SHA-256 Secure Hash Algorithm (FIPS 180-3)
SSH Secure Shell (RFC 4251)
SSL Secure Socket Layer (RFC 6101)
TLS Transport Layer Security (RFC 5246)
TLSA DANE resource record (RFC 6698)
X.509 ITU X.509.

Description

Embodiments comprise a security reliance metric for assessing cryptographic material based on a variety of weighted, independent, or interdependent factors, such as known vulnerabilities; compliance to standards, policies, and best practices; geographic locations and boundaries; and normative deviations through statistical analysis and extrapolation, and heuristic contingencies. Some embodiments dynamically adjust initial empirical scoring assignments based on learning patterns.

When assessing the security reliance of cryptographic material, various factors, either independent or correlated, impact the overall security reliance. When considering cryptographic material, the security reliance factors can be broadly broken down into factors relating to the cryptographic material itself and factors related to the protocol, context or other environment in which it is used. Throughout this disclosure TLS will be used as an example although the principles of the disclosure equally apply to any type of cryptographic material such as public/private keys used in SSH, IPSec, S-BGP, and DNSSEC. The following presents a simple overview of TLS as an example as context for the disclosure.

One commonly applied workflow for TLS uses X.509 certificates to establish a secure and authenticated connection between two systems. Thus, TLS uses both cryptographic material (the X.509 certificate) and a protocol (TLS) to establish the secure connection.

FIG. 1 illustrates a conceptual system architecture 100 for determining a security reliance score 112 for assessing cryptographic material. As explained in more detail below, a security reliance score 112 is based on (block 102) a plurality of property scores (108, 110). As explained in further detail below, in some embodiments the security reliance score 112 is a weighted aggregation 102 of individual property scores (108, 110). Properties scored for particular cryptographic material typically include properties for the cryptographic material itself and/or the environment or context in which the cryptographic material is used.

Using TLS as an example, properties may include, but are not limited to one or more properties for X.509 certificate (or other cryptographic material) and one or more properties for the TLS configuration.

As further explained below in some embodiments, property scores (108, 110) are determined and/or calculated using specific aggregating functions (104, 106) having as inputs individual attribute scores (114, 116, 118, 120) that make up the properties. These specific aggregating functions can be selected based on the attributes. In the embodiments shown below, the aggregating functions in one case is a weighted sum. In another case, the aggregating function is a table lookup that takes as an input individual attribute scores and produces as an output the property score. In yet another case, the function is an assignment of a score based on some attribute value (like estimated security strength). In yet another case, individual attribute scores are used as input into a table lookup and the resultant values from the table used as input into a weighted sum. In the representative embodiments below, these aggregating functions are chosen to illustrate the variety of aggregating functions that are possible. Furthermore, it illustrates the principle that some types of attributes lend themselves more closely to a particular type of aggregating function than other types of aggregating functions.

Again using TLS as an example, attributes that make up the X.509 certificate property and TLS configuration property may include, but are not limited to:

1. Example X.509 certificate (or other cryptographic material properties):
   i. Public key length;
   ii. Public key algorithm;
   iii. Certificate's validity period;
   iv. Public key's cryptoperiod;
   v. Certificate's signature algorithm;
   vi. Certificate revocation status repository references such as CDP and OCSP (Authority Information Access);
   vii. Configuration of certificate extension attributes, e.g., key usage, extended key usage, policy and name constraints.
   viii. Certificate's issuer vetting process (DV, OV, EV);
   ix. Certificate's issuer origin;
2. Example TLS configuration attributes:
   i. TLS compression enabled/disabled;
   ii. (Multiple-) Certificate status request enabled/disabled;
   iii. TLS insecure renegotiations enabled/disabled;
   iv. Protocol version support (best and worst);
   v. Cipher suite support (best and worst) and cryptographic primitives configuration, e.g., PFS support, block-cipher chaining mode, block-cipher authentication mode;
   vi. Session resumption support and implementation, e.g., session tickets as described in RFC 5077.

As indicated by adjustment operations (142, 144, 146, 148, 150, 152, 154) the various scores can be adjusted by a variety of functions. The adjustment operations are illustrated as optional as not all embodiments need employ such adjustments. The adjustment operations are also optional in that in the embodiments that do employ adjustments, not all attribute scores, property scores, or security reliance score are adjusted. In the representative embodiments below, learning algorithms, pattern recognition and statistical sampling are used to adjust one or more attribute scores and the security reliance score. The former based on changes in environment over time and the latter based on whether the cryptographic material/environment are anomalous in some fashion. The machine learning algorithms, pattern recognition, statistical sampling, and/or other analytical algorithms are represented by analytics 156, which drives the adjustments (142, 144, 146, 148, 150, 152, 154). Not all adjustments use the same algorithms or methods of calculation and the representative embodiments below show such variations.

Weight operations (130, 132, 134, 136, 138, 140) illustrate that the attribute and/or property scores can be weighted in some instances (possibly after adjustment). For example, if the aggregating function (104, 106, and/or 102) is a weighted sum, the weight operations (130, 132, 134, 136, 138, 140) can represent the individual weights applied to the attribute and/or property scores (as appropriate) before summing.

Summarizing the above discussion, individual attribute values (122, 124, 126, 128) are optionally adjusted (142, 144, 146, 148), optionally weighted (130, 132, 134, 136) and aggregated (104, 106) to produce property scores. These property scores are, in turn, optionally adjusted (150, 152) and optionally weighted (138, 140) to produce property scores (108, 110) which are further aggregated (102) to produce a security reliance score (112), which again may be adjusted (154).

Although not illustrated in the diagram, individual security reliance scores 112 can be further aggregated using the same structure (e.g., optionally adjusted and/or optionally weighted values of security reliance values further aggregated to provide higher level security reliance scores, which are further aggregated and so forth) to produce security reliance scores for systems, groups of systems, cryptographic material holders, company regions, subsidiaries, and so forth to produce security reliance scores at multiple levels throughout a company, geographic region, vertical industry, or any other categorization. In these further aggregations, weighed sums, averages, lookup tables, and so forth can all be utilized in this further aggregation.

In one representative embodiment, further aggregations are done on a system, business line, enterprise and business vertical level. System can include either individual systems or collections of systems, like a data center or other collection. Business line includes departments or functions within an enterprise, such as accounting, legal, and so forth. Enterprise includes either a major component of an enterprise (subsidiary, country operations, regional operations, and so forth), or then entire global enterprise. A business vertical includes either the business or major components categorized into a standard category representing the type or area of business, such as the Global Industry Classification Standard (GICS) used by MSCI, Inc. and Standard & Poor's.

In order to perform the aggregation of security reliance scores on these various levels, aggregating functions can be used. In one example embodiment an average of security reliance scores from cryptographic material at the relevant levels is used as the aggregate security reliance score for that level. In another example embodiment, in order not to have low security reliance scores balanced out by high security reliance scores, security reliance scores can be used to identify a customizable number of configurations that meet a designated criteria. In one embodiment, the configurations with the 10 lowest security reliance scores are identified. These configurations can then be compared to peer configurations at the system, business line, enterprise and/or business vertical level to compare aggregate security reliance across these various levels.

Figure 2:
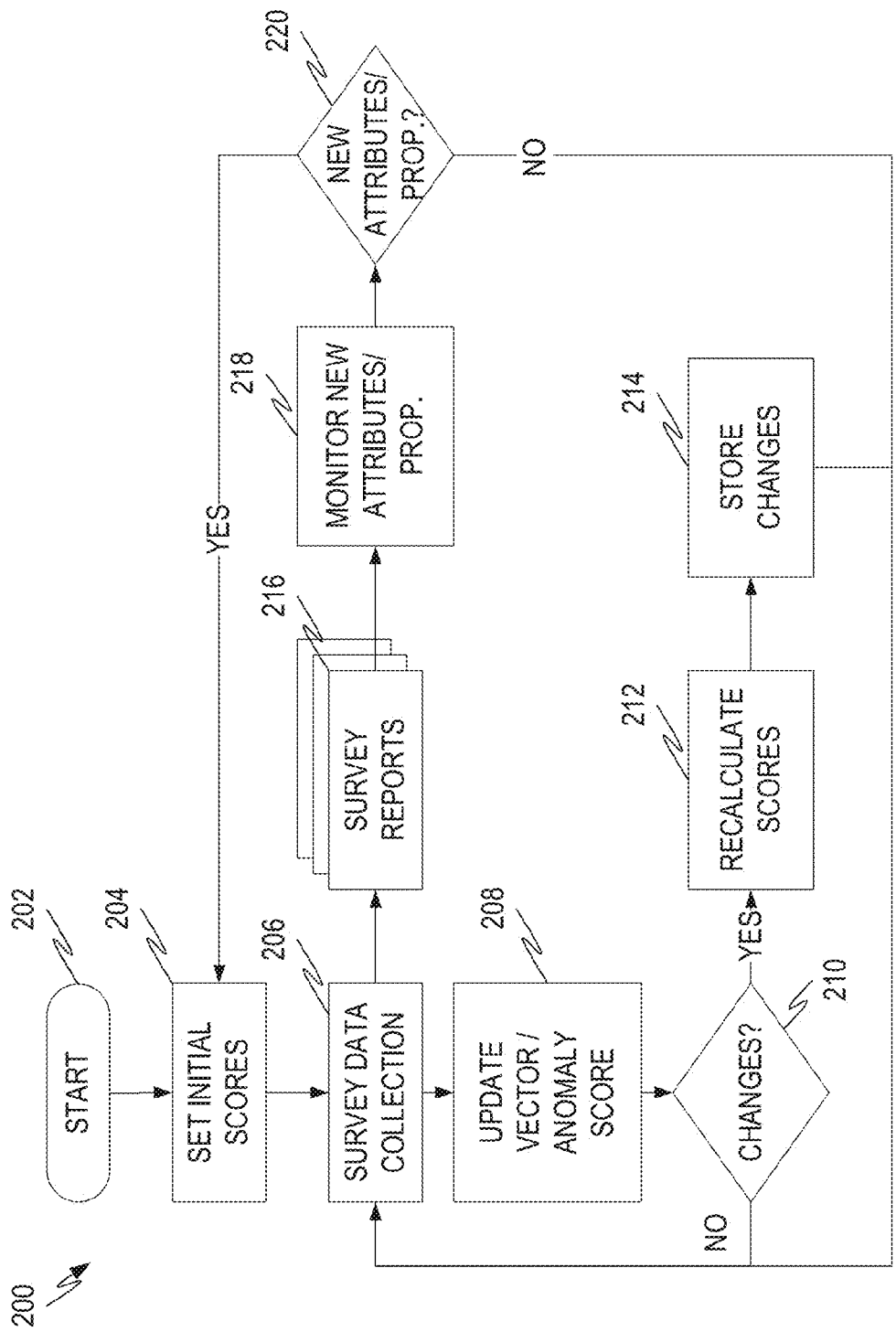
FIG. 2 illustrates an example flow diagram for calculating a security reliance score.

FIG. 2 illustrates a representative flow diagram 200 illustrating processing algorithms associated with calculating security reliance scores. As explained below, the process takes initial values and then applies learning algorithms, pattern matching, statistical analysis, surveys, and other information to constantly update the security reliance scores to account for a shifting security environment and to ensure that the security reliance scores reflect the current reality.

The process starts at 202 and proceeds to operation 204 where the initial attribute and/or property values are identified and set. Although not explicitly shown, identifying which set of attributes and/or properties are going to be utilized in the score can also be performed prior to setting the initial values.

Summary of the Scoring Model and Setting Initial Values

A methodology used in some embodiments to set the initial values of properties and attributes can rely on analytical work or heuristics previously performed offline. For example, publications exist that give estimates of security strength that can, in turn, be combined with other information using customizable or predefined rules in order to arrive at the initial values. In one representative example, "Recommendation for Key Management—Part 1: General (Revision 3)", NIST Special Publication, 800-57, 2012, National Institute of Standards and Technology (hereinafter "Key Management Recommendations"), incorporated herein by reference describes a security strength measurement for particular key lengths. In embodiments illustrated below, information regarding security strength for various attributes from this and other sources are utilized along with heuristics to arrive at initial score mappings, as explained blow. As one example and as described in this reference, in 2015, the key length for an RSA key of 2048 bits corresponds to 112 bit security strength and indicates that by itself this can be considered as sufficient, though not optimal. Thus, a 0.8 particular initial value assignment for this attribute on a scale of [0,1] can account for a "sufficient, but not optimal" assessment. Throughout the disclosure values for properties and attributes will be illustrated on a scale of [0,1], and such values are used in some embodiments. However, other embodiments can use a different scale for values and all are encompassed within the disclosure.

Instead of assigning initial values based on the model that the various attributes are independent, correlation between several attributes are considered when assigning initial values in some embodiments. Such correlations can be identified either by offline analysis or through the learning algorithm (see below) employed in some embodiments. Correlations from the learning algorithm can be constantly adjusted leading to a dynamic score that accounts for a shifting security evaluation over time and thus, initial values can take into account the latest determination of correlation between attributes. For example, in the context of a TLS-secured connection, the key length of the public key embedded in an X.509 TLS server certificate and the validity period of such certificate based, for example, on determining the cryptoperiod of the underlying private key, are correlated. The Key Management Recommendations reference discussed above describes various attributes that can affect the cryptoperiod and suggests various cryptoperiods.

As one example, assume a X.509 certificate with an RSA public key of 2048 bits. As indicated above, in the absence of any correlation consideration, a value of 0.8 might be assigned as an initial value. When cryptoperiod is considered, however, the initial value may change. Continuing with the example, assume that a recommended cryptoperiod for a key of this type and this length is 1-2 years when the key is used for authentication or key exchange. If the certificate has a three-year validity period, the certificate deviates from the recommended cryptoperiod of 1-2 years for private keys used to provide authentication or key-exchange. To reflect this deviation, a 0.7 initial value can be assigned.

Development of the Scoring Model and Setting Initial Values

The following represents example embodiments of how initial scores are set in operation 204. As previously summarized in conjunction with FIG. 1, an overall score can be calculated as an aggregation of weighted property scores of security-relevant properties, $P_0, \ldots, P_n$. Such an aggregation takes the form of a weighted sum in some embodiments. Let $P_i$ identify a property, $W_{P_i}$ be a weight assigned to the respective property and $\sigma_{P_i}$ be a scalar value representing the value of the property, whose calculation is described in detail below. The overall score, $\sigma$, can then be described as:

$$\sigma := \begin{cases} \Delta, & \text{if debasing condition is met} \\ \Psi\left(\sum_{i=0}^{n} \sigma_{P_i} \cdot W_{P_i}, \Omega\right), & \text{otherwise} \end{cases}$$

Where:

$\Delta$ is a constant scalar value representing a minimal customizable, but fixed value when one or more debasing conditions $D_0, \ldots, D_m$ is met. A debasing condition is a condition that would cause the security property to lose some or all of its value in terms of contribution to security strength. An example might be the discovery that a particular secret key has been compromised, e.g., by discovering the key on a seized hacking site. Debasing conditions can be defined as a list or rules that are updated periodically. A suitable value for $\Delta$ in some embodiments is 0.

$\sigma_{P_i}$ is the value (score) for property $P_i$.

$W_{P_i}$ is the weight for property $P_i$.

$\sigma_{P_i} \cdot W_{P_i}$ is the weighted score for property $P_i$ and represents the initial value of the security reliance score (before any adjustment by the anomaly score).

$\Omega$ is an anomaly score derived from a statistical analysis, by applying dynamic pattern recognition and/or by evaluating additional context-sensitive data (described below).

$\Psi:[0,1]\times[0,1]\rightarrow[0,1]$ is a function that aggregates the sum of the weighted property scores ($\sum_{i=0}^{n}\sigma_{P_i}\cdot W_{P_i}$) and the anomaly score ($\Omega$). This function is described below.

In the discussion that follows, all weights and values ($\sigma$) are assigned in the interval [0,1], although different intervals may be used for different embodiments. Each property $P_i$, for $0 \leq i \leq n$, comprises of a set of attributes $A_{0,P_i}, \ldots, A_{k,P_i}$, describing specific configuration settings or other attributes, with a particular value, $\sigma_{A_j,P_i}$ and a particular weight, $W_{A_j,P_i}$. The property score $\sigma_{P_i}$ for each property $P_i$ is calculated based on a formula specific to the property. As described above in conjunction with FIG. 1, this can take the form of a sum of weighted attribute scores (e.g., $P_0$), as single score assignments (e.g., $P_1$), or as a lookup matrix of fixed attribute scores according to a property's attribute configuration (e.g., $P_3$) or some other way of combining the individual attribute scores into a property score.

As explained above, one method of assigning initial values is to utilize recommendations of relevant regulatory bodies like NIST to identify starting information (like configuration recommendations, security strength, etc.) and then select initial values, weights, and so forth based on heuristical assessment. For example, NIST provides in various publications recommendations on configurations, security strength (in bits) for cryptographic primitives, key lengths, cryptoperiods and so forth. These can be used, as shown below, to derive weights, scores and so forth.

In one embodiment assessing the cryptographic strength of TLS and related cryptographic material uses five properties:

1. $P_0$ (TLS Configuration), which comprises configurable criteria addressing security relevant features of the TLS protocol;
2. $P_1$ (TLS Security) comprises configurable security parameters;
3. $P_2$ (Certificate Context) comprises security relevant infrastructure or application protocol configurations in which a X.509 TLS server certificate is being used;
4. $P_3$ (Certificate Security) comprises of a certificate's security parameters; and
5. $P_4$ (Revocation Infrastructure) comprises of the availability and accessibility of a certificate's relevant revocation infrastructure.

In an example embodiment, these properties might be weighted as follows: $W_{P_0}:=0.2$, $W_{P_1}:=0.2$, $W_{P_2}:=0.15$, $W_{P_3}:=0.25$, and $W_{P_4}:=0.2$ respectively.

Calculation of the initial property scores $P_0$-$P_4$ will now be described for various embodiments.

In one embodiment, the property $P_0$ (TLS configuration) comprises three attributes: $A_{0,P_0}$ (Compression); $A_{1,P_0}$ ((Multiple) Certificate Status Request); and $A_{2,C_0}$ (Renegotiation). The weights and attribute scores associated with the attributes in this embodiment are:

$$W_{A_0,P_0} := 0.4, \sigma_{A_0,P_0} := \begin{cases} 0.4, & \text{TLS Compression enabled} \\ 1, & \text{TLS Compression disabled} \end{cases}$$

$$W_{A_1,P_0} := 0.2, \sigma_{A_1,P_0} := \begin{cases} 1, & \text{((Multiple) Certificate Status Request supported} \\ 0.6, & \text{((Multiple) Certificate Status Request not supported} \end{cases}$$

$$W_{A_2,P_0} := 0.4, \sigma_{A_2,P_0} := \begin{cases} 0.3, & \text{TLS Insecure Renegotiation enabled} \\ 1, & \text{TLS Insecure Renegotiation disabled} \end{cases}$$

$A_{0,P_0}$ (Compression) refers to the TLS configuration option described in RFC 4346, Sec. 6.2.2, in which a compression algorithm other than CompressionMethod.null is chosen, $A_{1,P_0}$ ((Multiple) Certificate Status Request) refers to RFC 6961 and RFC 6066, Sec. 8, $A_{2,P_0}$ (Renegotiation) refers to the support of a vulnerable type of the insecure TLS renegotiation extension, see RFC 5746 for insecure and secure renegotiation.

Additionally, in one embodiment, debasing conditions are defined. $D_0$ (Certificate Expired):=$\Delta$, $D_1$ (Certificate Revoked):=$\Delta$ might be considered as reasonable debasement conditions. Here $D_0$ defines the condition, in which the validity period of an investigated X.509 TLS server certificate is expired and $D_1$ the condition, in which an investigated X.509 TLS server certificate has been revoked by its issuing certification authority. If any of these two conditions is met by a X.509 TLS server certificate securing an investigated network service, the value $\Delta$ is assigned to the overall score. As indicated above, in some variations of this embodiment, $\Delta$ is zero, indicating that the debasing effect of an expired or revoked certificate cannot be compensated by any other security property configuration.

The scoring and weights of these attributes in this embodiment is based on known exploits or recommended best practices. An enabled TLS Compression leaves, for example, an HTTPS session susceptible to exploits targeted at TLS Compression, see RFC 7457 Sec. 2.6 and T. Polk, K. McKay, and S. Chokhani, "Guidelines for the Selection, Configuration, and Use of Transport Layer Security (TLS) Implementations", NIST Special Publication, 800-52 Revision 1, 2014, National Institute of Standards and Technology (hereinafter "TLS Implementation Guidelines"), Sec. 3.7, for security considerations. Support for TLS's Certificate Status Request (the precursor to Multiple Certificate Status Request, which is recommended in TLS Implementation Guidelines, Sec. 3.4.2.4), is mandatorily required by NIST, (TLS Implementation Guidelines, Sec. 3.4.1.2) and when not supported, represents a deviation from recommended practice. An insecure TLS Renegotiation is susceptible to exploits; see RFC 7457 Sec. 2.10 and RFC 5746.

The property score $\sigma_{P_0}$ for property $P_0$ in this embodiment might be calculated by summing up the weighted attribute score assignments of the attributes described above.

$$\sigma_{P_0} := \sum_{j=0}^{2} W_{A_j,P_0} \cdot \sigma_{A_j,P_0}$$

In one embodiment the property $P_1$ (TLS Security) might initially assign attribute scores empirically based on the strength of a cipher suite's cryptographic primitives, see RFC 5246 Appendix A.5 and Key Management Recommendations. In compliance with TLS Implementation Guidelines, Sec. 3.3.1, all cryptographic primitives are expected to provide at least 112 bits of security. With that background as a starting point, the attributes of $P_1$ are defined by different security strength (in bits) values, i.e., $A_{0,P_1}$ (<112), $A_{1,P_1}$ (112), $A_{2,P_1}$ (128), $A_{3,P_1}$ (192), and $A_{4,P_1}$ (256). The security strength values can be assigned initial attribute values of: $\sigma_{A_0,P_1}:=0$, $\sigma_{A_1,P_1}:=0.6$, $\sigma_{A_2,P_1}:=0.8$, $\sigma_{A_3,P_1}:=0.9$, and $\sigma_{A_4,P_1}:=1$.

The security strength of the weakest cryptographic primitive in the cipher suite, as defined in Key Management Recommendations, determines the attribute score assignment. In other words, the cryptographic primitives of a particular cipher suite are examined and the security strength of each cryptographic primitive is determined (e.g., by the values from Key Management Recommendations or in some other consistent fashion). The lowest relative security strength is then selected as the security strength associated with the cipher suite. Based on that security strength, the closest attribute value that does not exceed the actual security strength is selected and the corresponding score used for $\sigma_{A_j,P_1}$. The property score, $\sigma_{P_1}$, is then the selected score, $\sigma_{A_j,P_1}$. Thus:

$$\sigma_{P_1} := \sigma_{A_j,P_1}$$

where $\sigma_{A_j,P_1}$ is the score corresponding to the value of the lowest strength security primitive.

As an example, if the lowest security strength of all the primitives of a particular cipher suite was 127 bits, then the attribute associated with the cipher suite would be $A_{1,P_1}$ (112 bits) since 112 is the closest value that does not exceed the value of 127, and the attribute value of $\sigma_{A_j,P_1}:=0.6$ would be assigned. As a more complicated example, consider the cipher suite defined by "TLS_RSA_WITH_AES_128_GCM_SHA256." This means that the cipher suite uses RSA for the key exchange, AES with a 128 bit key, Galois/Counter Mode (GCM) as the block cipher chaining mechanism, and a SHA-256 hashing algorithm. If the RSA key exchange is based on a public key size of at least 3072 bits, thus providing at least 128 bits of security strength, the cipher suite in this embodiment is assigned to the value $A_{2,P_1}$ (128 bits), as AES-128 provides 128 bits of security strength (see Key Management Recommendations), even though SHA-256 for HMACs is considered to provide 256 bits of security strength (see Key Management Recommendations). An ephemeral DH key exchange, necessary in order to support Perfect Forward Secrecy (PFS), is similarly evaluated, e.g., an ECDHE key exchange based on the NIST approved curve P-256 is considered to provide 128 bits of security strength, see Key Management Recommendations and hence assigned to the value $A_{2,P_1}$.

In one embodiment, the property $P_2$ (Certificate Context) comprises attributes declaring support for Certificate Transparency, see RFC 6962, support for DNS-Based Authentication of Named Entities (DANE), see RFC 6698, support for HTTP Strict Transport Security (HSTS), see RFC 6797, and support for Public Key Pinning Extension for HTTP (HPKP), see RFC 7469. The weights and attribute scores associated with the attributes in this embodiment are:

$$W_{A_0,P_2} := 0.3, \sigma_{A_0,P_2} := \begin{cases} 1, & \text{SCT present (CT supported)} \\ 0.6, & \text{otherwise} \end{cases}$$

$$W_{A_1,P_2} := 0.1, \sigma_{A_1,P_2} := \begin{cases} 1, & \text{TLSA resource record present (DANE supported)} \\ 0.8, & \text{otherwise} \end{cases}$$

$$W_{A_2,P_2} := 0.3, \sigma_{A_2,P_2} := \begin{cases} 1, & \text{HSTS supported} \\ 0.4, & \text{otherwise} \end{cases}$$

$$W_{A_3,P_2} := 0.3, \sigma_{A_3,P_2} := \begin{cases} 1, & \text{HPKP supported} \\ 0.6, & \text{otherwise} \end{cases}$$

Similarly to property $P_0$ (TLS Configuration), the property score $\sigma_{P_2}$ is again defined as the summation of the weighted attribute scores:

$$\sigma_{P_2} := \sum_{j=0}^{3} W_{A_j,P_2} \cdot \sigma_{A_j,P_2}$$

In another embodiment attribute values might be correlated to a combination of conditions and/or other attributes in even different properties. In one embodiment a two-dimensional correlation can be represented by a matrix with a cell-based attribute score assignment. Assuming a uniform weight distribution, the property score can be retrieved by a table lookup in such matrix. If non-uniform weights are desired, after the table lookup, the property score can be weighted accordingly.

Calculating the scores for an example embodiment of $P_3$ (Certificate Security), illustrates such a correlation. This embodiment also illustrates an example where correlation between a combination of conditions attributed in different properties. In this embodiment, attributes of $P_3$ comprise the size of a public key embedded in a certificate ($A_{0,P_3}$), its cryptoperiod ($A_{1,P_3}$), whether PFS is supported and the key hashing algorithm used ($A_{2,P_3}$). In this embodiment, the security strength (in bits) (see Key Management Recommendations) for the size of the public key embedded in a certificate is used to map the attribute $A_{0,P_3}$ to an attribute score using the following mapping:

$$A_{0_0,P_3}(<112), \sigma_{A_{0_0},P_3} := 0, A_{0_1,P_3}(112),$$

$$\sigma_{A_{0_1},P_3} := 0.5, A_{0_2,P_3}(128), \sigma_{A_{0_2},P_3} := 0.8, A_{0_3,P_3}(192),$$

$$\sigma_{A_{0_3},P_3} := 0.9, \text{ and } A_{0_4,P_3}(256), \sigma_{A_{0_4},P_3} := 1$$

The mapping is accomplished by selecting the attribute with security strength that is lower than, or equal to, the security strength of the corresponding key length.

A certificate's public key's cryptoperiod, attribute $A_{1,P_3}$ is mapped to an attribute score using the following mapping (cryptoperiod measured in years):

$$A_{1_0,P_3}(<5), \sigma_{A_{1_0},P_3} := 0.1, A_{1_1,P_3}((3, 5]), \sigma_{A_{1_1},P_3} := 0.3,$$

$$A_{1_2,P_3}((2, 3]), \sigma_{A_{1_2},P_3} := 0.6, A_{1_3,P_3}([1, 2]),$$

$$\sigma_{A_{1_3},P_3} := 0.8, \text{ and } A_{1_4,P_3}(<1), \sigma_{A_{1_4},P_3} := 1.$$

To accomplish this mapping the length of time the key has been in use is simply placed into the correct bucket and the corresponding score assigned. The cryptoperiod of a public key embedded in a certificate is, ignoring a pre-mature revocation, at least as long as, but not limited to the certificate's validity period, e.g., consider certificate renewals based on the same underlying key pair.

An interdependency exists between key length, the time the key has been in use (cryptoperiod) and support for Perfect Forward Secrecy (PFS). The longer the time has been in use, the more likely it is to be compromised. The longer the key length, the less likely it is to be compromised within a given time period. PFS helps ensure that compromise of a private key used in deriving session keys does not compromise previously derived session keys, thus helping to ensure long term confidentiality of the session even in the face of such a compromise. Support for PFS is represented by the key-exchange indicator in the negotiable cipher suites supported by a network service as mentioned in the description of property $P_1$ (TLS security). The key-exchange algorithm is encoded in the TLS cipher suite parameter (see IANA for a list of registered values) and indicated by KeyExchangeAlg in the normative description for cipher suites TLS_KeyExchangeAlg_WITH_EncryptionAlg_Message-AuthenticationAlg, see (TLS Configuration, Sec. 3.3 and Appendix B)

The combination of the security strength for the public key, the key's accumulated cryptoperiod and an optional support for PFS for an example embodiment is captured by the following table.

TABLE 1

Value lookup table for key strength, cryptoperiod and PFS support

|  | $A_{1_0,P_3}$ | $A_{1_1,P_3}$ | $A_{1_2,P_3}$ | $A_{1_3,P_3}$ | $A_{1_4,P_3}$ |
|---|---|---|---|---|---|
| $A_{0_0,P_3}$ | 0 | 0 | 0 | 0 | 0 |
| $A_{0_1,P_3}$ $A_{0_2,P_3}$ $A_{0_3,P_3}$ $A_{0_4,P_3}$ | $\begin{cases} \dfrac{\sigma_{A_{0i},P_3}+\sigma_{A_{1j},P_3}}{2}, & 0\le i\le 4, 0\le j\le 4,\text{ without PFS support} \\ \sigma_{A_{i},P_1}, & 0\le k\le 4,\text{ with k according to the PFS security strength} \end{cases}$ | | | | |

With PFS being an embodiment of the cryptographic primitives the scoring of which is introduced for the property $P_1$ (above). PFS is scored according to the security strength bucket definitions for $\sigma_{A_j,P_1}$ with $0\le j\le 4$.

To complete the calculation of the overall score $\sigma_{P_3}$ for property $P_3$, the hashing part of the certificate's signature algorithm ($A_{2,P_3}$) can be scored (e.g., according to NIST's security strength assignment in Key Management Recommendations). Similarly to the key size evaluation, the score assignment can be given as:

$$A_{2_0,P_3}(<80), \sigma_{A_{2_0},P_3}:=0, A_{2_1,P_3}(80), \sigma_{A_{2_1},P_3}:=0.4,$$
$$A_{2_2,P_3}(112), \sigma_{A_{2_2},P_3}:=0.6, A_{2_3,P_3}(128), \sigma_{A_{2_3},P_3}:=0.8,$$
$$A_{2_4,P_3}(192), \sigma_{A_{2_4},P_3}:=0.9, \text{ and } A_{2_5,P_3}(256), \sigma_{A_{2_5},P_3}:=1.$$

Using a uniform weight for the attributes in the table, the attribute score $\sigma_{A_0\times A_1 lookup,P_3}$ can be obtained by a matrix lookup from Table 1, leading to a property score:

$$\sigma_{P_3}:=W_{A_0\times A_1 lookup,P_3}\cdot\sigma_{A_0\times A_1 lookup,P_3}+W_{A_2,P_3}\cdot\sigma_{A_2,P_3}$$

where: $W_{A_0\times A_1 lookup,P_3}:=0.8$, $W_{A_2,P_3}:=0.2$ and $$\sigma_{A_2,P_3}\in\{\sigma_{A_{2_0},P_3},\ldots,\sigma_{A_{2_5},P_3}\}$$

from the paragraph above.

In one embodiment, the property $P_4$ (Revocation Infrastructure) might initially assign attribute scores based on the availability and accuracy of the revocation infrastructure employed by a certificate's issuer. The "better" the revocation infrastructure, the less likely it is that a revoked certificate will be determined to be unrevoked. In this context "better" can be defined by a relationship between Certificate Revocation List (CRL) Distribution Points (CDPs), see RFC 5280, Sec. 4.2.1.13, and Online Certificate Status Protocol (OCSP), see RFC 6960, responders assigned as revocation status access points for a specific certificate. The table below captures the attribute scores for a representative relationship.

TABLE 2

Value lookup for CDP vs. OSCP support

|  | CDP I | CDP II | CDP III | CDP IV | CDP V |
|---|---|---|---|---|---|
| OCSP I | 1.0 | 0.9 | 0.7 | 0.2 | {0.9, if subscriber; 0, if subordinate CA} |
| OCSP II | 0.8 | 0.7 | 0.5 | 0.1 | {0.6, if subscriber; 0, if subordinate CA} |
| OCSP III | 0.6 | 0.5 | 0.3 | 0 | {0.4, if subscriber; 0, if subordinate CA} |
| OCSP IV | 0.3 | 0.2 | 0.1 | 0 | 0 |
| OCSP V | 0.7 | 0.5 | 0.4 | 0 | 0 |

Where:

CDP I: At least one CDP entry exists; the CRL (and optionally Delta-CRLs, if Delta CRLs comply with the applicable authoritative policy) retrieved from this CDP (or authoritative redirected CDPs, CDP redirection complies with the applicable authoritative policy) is valid (CRL is not expired, the CRL has been signed by an authorized entity, and the signature can be successfully validated); for subscriber certificates, the update interval (nextUpdate-thisUpdate) is less than or equal to seven days; for subordinate CA certificates the update interval is less than or equal to twelve months.

CDP II: At least one CDP entry exists; the CRL (and optionally Delta-CRLs, if Delta CRLs comply with the applicable authoritative policy) retrieved from this CDP (or authoritative redirected CDPs, CDP redirection complies with the applicable authoritative policy) is valid (CRL is not expired, the CRL has been signed by an authorized entity, and the signature can be successfully validated); for subscriber certificates, the update interval (nextUpdate-thisUpdate) is greater than seven days, but less than or equal to ten days; for subordinate CA certificates the update interval is less than or equal to twelve months.

CDP III: At least one CDP entry exists; the CRL (and optionally Delta-CRLs, if Delta CRLs comply with the applicable authoritative policy) retrieved from this CDP (or authoritative redirected CDPs, CDP redirection complies with the applicable authoritative policy) is valid (CRL is not expired, the CRL has been signed by an authorized entity, and the signature can be successfully validated); either for subscriber certificates, the update interval (nextUpdate-thisUpdate) is greater than ten days or for subordinate CA certificates the update interval is greater than twelve months.

CDP IV: At least one CDP entry exists; the CRL (and optionally Delta-CRLs, if Delta CRLs comply with the applicable authoritative policy) cannot be retrieved from this CDP (or authoritative redirected CDPs, CDP redirection complies with the applicable authoritative policy) or is not valid (CRL is expired, the CRL has been signed by an unauthorized entity, or the signature cannot be successfully validated).

CDP V: A CDP entry does not exist.

And

OCSP I: At least one OCSP responder URL and/or a stapled response is provided (intercorrelation to $A_{1,P_0}$ ((Multiple) Certificate Status Request)); the OCSP responder can be successful queried, the OCSP response is valid (OCSP response is syntactically correct, OCSP response has been signed by an authorized entity, and the signature can be successfully validated); for subscriber certificates, the update interval (nextUpdate-thisUpdate) is less than or equal to four days; for subordinate CA certificates the update interval is less than or equal to twelve months.

OCSP II: At least one OCSP responder URL is provided; the OCSP responder can be successful queried, the OCSP response is valid (OCSP response is syntactically correct, OCSP response has been signed by an authorized entity, and the signature can be successfully validated); for subscriber certificates, the update interval (nextUpdate-thisUpdate) is greater than four days, but less than or equal to ten days; for subordinate CA certificates the update interval is less than or equal to twelve months.

OCSP III: At least one OCSP responder URL is provided; the OCSP responder can be successful queried, the OCSP response is valid (OCSP response is syntactically correct, OCSP response has been signed by an authorized entity, and the signature can be successfully validated); either for subscriber certificates, the update interval (nextUpdate-thisUpdate) is greater than ten days or for subordinate CA certificates the update interval is greater than twelve months.

OCSP IV: At least one OCSP responder URL is provided; the OCSP responder cannot be queried or the OCSP response is not valid (OCSP response is syntactically incorrect, OCSP response has been signed by an authorized entity, or the signature cannot be successfully validated).

OCSP V: An OCSP responder URL is not provided.

The particular scoring uses policy guidelines applying to X.509 TLS server certificates, (e.g., see "Baseline Requirements for the Issuance and Management of Publicly-Trusted Certificates, v.1.3.0", Forum Guideline, https://cabforum.org/baseline-requirements-documents, 2015, CA/Browser Forum, Sec. 4.9, 7.1.2.2, 7.1.2.3, "Guidelines For The Issuance And Management Of Extended Validation Certificates, v.1.5.5", Forum Guideline, https://cabforum.org/extended-validation, 2015, CA/Browser Forum, Sec. 13) and then applies a heuristic assessment to arrive at the mapped scores. Assuming a uniform weight, the attribute score $\sigma_{P_4}$ can be obtained by a matrix lookup from Table 2 above.

The initial property scores, $P_0 \ldots P_4$ can then be combined using the weights given above according to the equation given above to get the initial security reliance score for this embodiment:

$$\sigma = 0.2P_0 + 0.2P_1 + 0.15P_2 + 0.25P_3 + 0.2P_4$$

Surveys and Data Collection

After the initial scores have been calculated and stored in operation 204, operation 206 uses survey and data collection methods to gather information needed for calculating and updating both the values of attributes and/or properties and the scores related thereto. In addition, changed attributes and/or properties can be identified to add new or remove existing attributes and/or properties from consideration.

Figure 3:
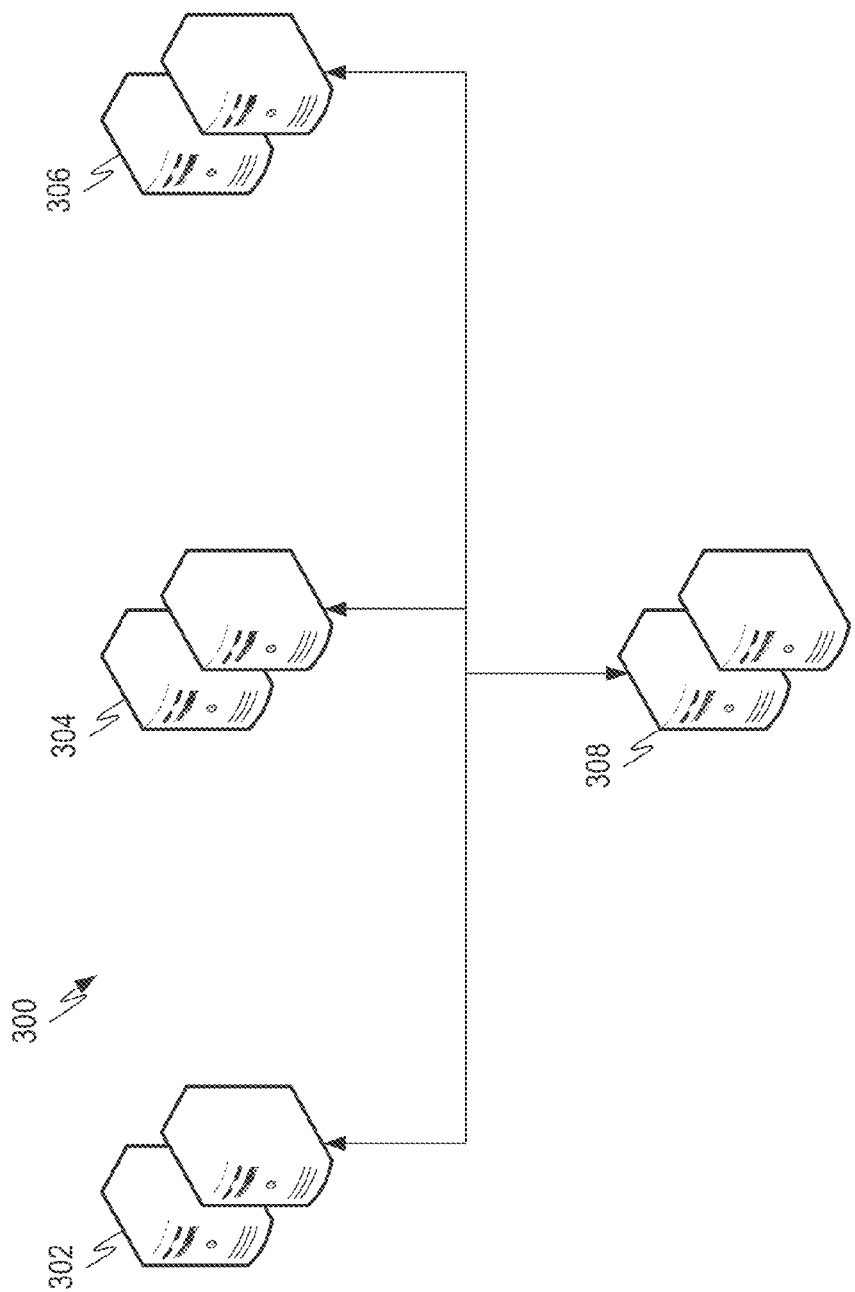
FIG. 3 illustrates an example deployment architecture.
Figure 4:
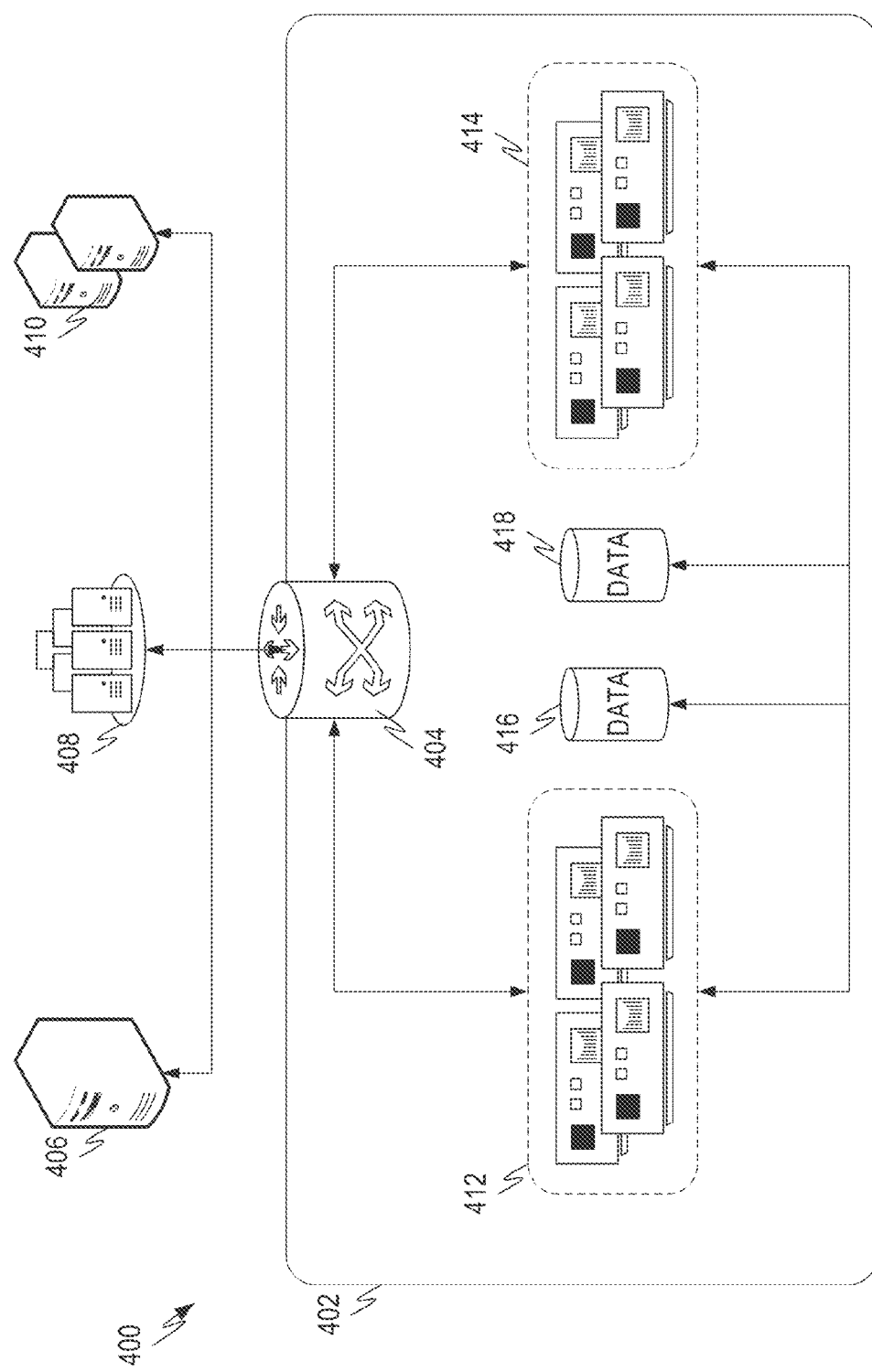
FIG. 4 illustrates another example deployment architecture.

In one embodiment, information pertaining to the TLS landscape of an organization is inventoried by utilizing databases containing public network address associations for the organization, e.g., database of a network registrar, DNS server and reverse DNS databases, and WHOIS queries can be exploited to create a set of an organization's publicly visible network services. Examples of this are described below. If internal network services of an organization are targeted, access to the internal network is assigned to the information collecting system (FIGS. 3 and 4 discussed below). In this case, internal databases—e.g., internal DNS zones, IP address management databases—are queried to map out available services inside an organization.

As a result of connecting to these services, system, network protocol, and cryptographic configurations are explored, collected, aggregated, and stored for later analytics processing.

In a representative embodiment, configuration data is collected by attempting TLS handshakes. This allows for an evaluation of the TLS specific configuration similar to the property score evaluation of the previously described property $P_0$ (TLS Configuration) and $P_1$ (TLS Security). Then, by obtaining the certificates employed in securing the service, certificate specific security information is gathered similar to the evaluation of $P_3$ (Certificate Security). In addition the application protocol, e.g., HTTP over TLS (HTTPS), can be explored to gather further security specific application settings, e.g., HSTS enabling, public key pinning over HTTP (HPKP) similar to the evaluation of the property $P_2$ (Certificate Context) or a subset of attributes thereof.

Turning to FIGS. 3 and 4 representative survey and data collection systems and methods will be described that are suitable for executing operation 206 of FIG. 2.

FIG. 3 depicts a representative architecture 300 to perform survey and data collection activities. In this representative architecture, a data collection and/or survey system 308 is connected to one or more systems (target systems 302, 304, 306) from which data is to be collected and/or surveys made. Connection can be made over a private network, public network, or combinations thereof as the type of connection doesn't matter as long as it is sufficient to allow the data collection/survey system 308 to collect the desired information. The data collection/survey system 308 interacts with the target systems 302, 304, 306 to identify cryptographic material and configuration information. The system operates as above, for example, to identify TLS information about the target systems. Thus, the data collection/survey system 308 can establish TLS connections with each system to identify all information needed. In some embodiments, multiple connections using multiple parameters are used to identify all of the configuration and cryptographic information that is desired. Thus, sufficient connection attempts can be made to identify the information used for analysis.

In other embodiments, in addition to or as an alternative to the above, information is collected from repositories, servers, or other systems/entities that may have already been collected. For example, application Ser. No. 14/131,635 entitled "System for Managing Cryptographic Keys and Trust Relationships in a Secure Shell (SSH) Environment," assigned to the same assignee as the present application and incorporated herein by reference, identifies systems and methods for centralized management of cryptographic information such as keys and discusses a method of data collection from various systems in an SSH type environment. Such systems may have information that can be used to perform the requisite analysis and so can be a source of information.

As information is collected, the information can be categorized and stored for later evaluation as described above.

Turning next to FIG. 4, this figure illustrates an example deployment architecture 400, that sets a data collection/survey system (such as 308 of FIG. 3) into a cloud and/or service architecture. As illustrated in FIG. 4, the system is deployed in a cloud 402, which may be a private, government, hybrid, public, hosted, or any other type of cloud. Such a cloud deployment typically includes various compute clusters 412, 414, databases such as archival storage 418 and database storage 416, load balancers 404 and so forth. Such a cloud deployment can allow for scaling when multiple users/target systems 406, 408, 410 exceed capacity or when lesser capacity is needed to support the desired users/target systems 412, 408, 410. Furthermore, such an architecture can be used when the functionality provided by the system is offered as a service. Finally, the various users and/or target systems 406, 408, 410 are representative of the type of users and/or target systems that can utilize such a service. In the diagram target system 406 represents a single system, target systems 410 represent a small or moderate size deployment with multiple target systems either alone or tied together using some sort of network and target systems 408 represent a large scale deployment, possibly a cloud deployment or a company with multiple data centers, many servers, and/or so forth.

Returning now to FIG. 2, operation 206 represents collection of data and or conducting surveys of target systems (such as by the architectures in FIGS. 3 and/or 4) to gather information for analysis. Information gathered can include, but is not limited to:

IP Address
DNS name
X.509 Certificate(s) (End-entity and any issuing certificates provided)
SSL/TLS protocol versions supported
Cipher suites supported
HSTS support
Susceptibility to common vulnerabilities
Application type(s) (Web Server, Application Server, SSH server, etc.)

Adjustment of Scores and Learning Model Description

Figure 5:
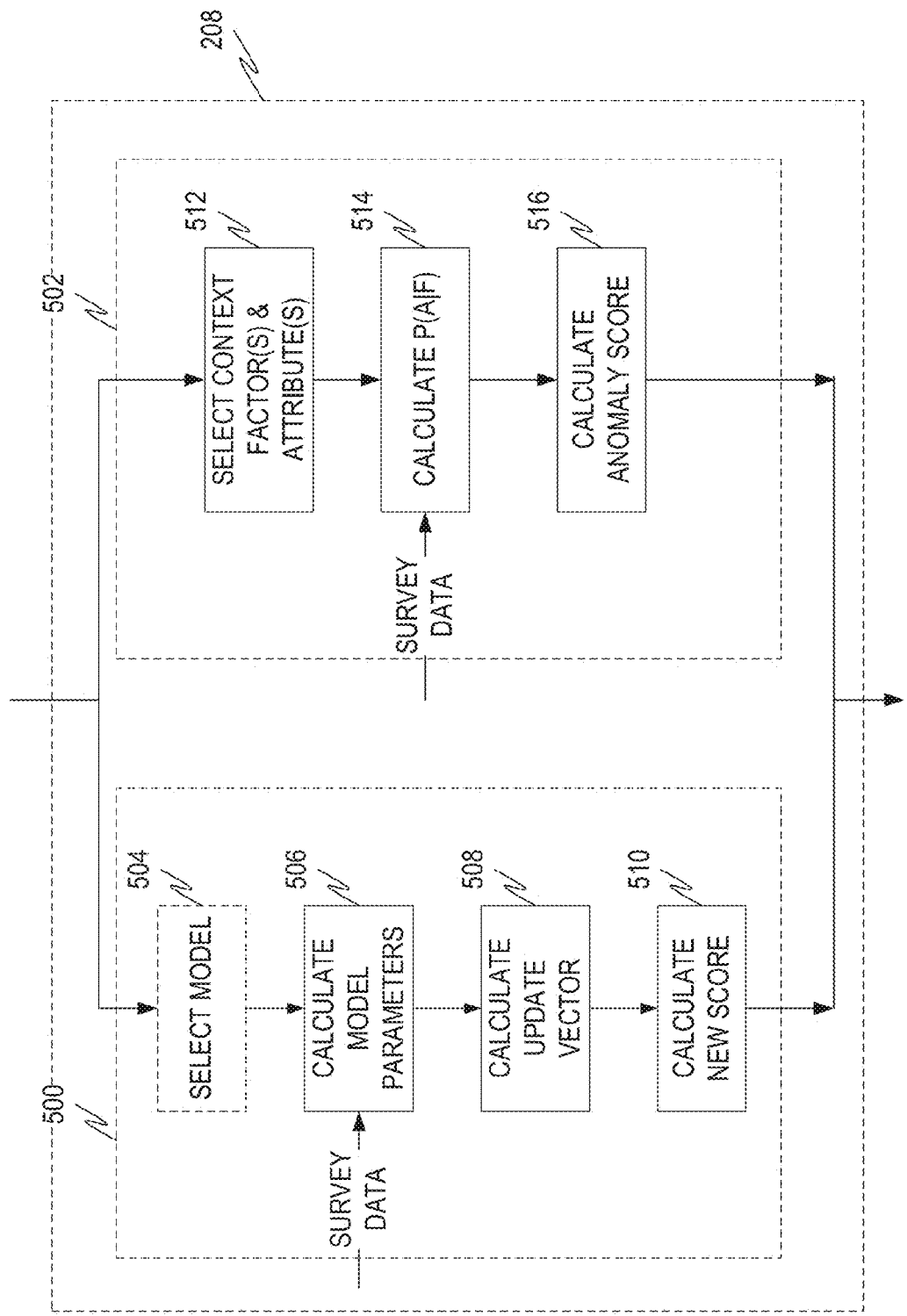
FIG. 5 illustrates representative details of the flow diagram of FIG. 2.

Once the information is collected in operation 206, operation 208 uses learning models, pattern recognition, statistical analysis and other methods to update attribute and/or properties values and scores based on various models. Specifically, operation 208 uses the information collected in operation 206 to calculate an update vector used in conjunction with an aggregation function to account for changes over time that should adjust attribute or other scores. The details of these processes are illustrated in FIG. 5.

As noted in conjunction with FIG. 1 above, attribute, property and overall scores can additionally be adjusted by applying statistical analysis, dynamic pattern recognition, and/or other learning algorithms and by evaluating additional context-sensitive data such as geographic location. One embodiment utilizes the principle that the security impact of a cryptographic primitive is related to its adoption rate relative to the baseline of growth of cryptographic material itself. Impact in this sense enhances the notion of security strength, which is based on a primitive's resilience against attacks. The following uses the hashing security primitive as an example of how a greater degree of adoption shows how the market trades off computational complexity with security impact.

In the Key Management Recommendations reference described above, the NIST identifies a security strength assignment of 256 bits for the signature hashing algorithm SHA-512, and a lower security strength of 128 bits for SHA-256. Both algorithms provide better security than SHA-1 (80 bits of security strength), but it is SHA-256 that has a higher adoption rate (due largely to the lack of support of public CAs for SHA-512). The higher adoption rate of SHA-256 over SHA-512 indicates that the additional increase in security strength for a single primitive like SHA-512 does not compensate for the additional computational complexity. The greater degree of adoption for a given primitive thus reflects its implementation impact.

Using the hashing algorithm of an X.509 TLS server certificate's signature as a representative example, the survey of publicly accessible network services secured by the TLS protocol provides the necessary data samples to assess adoption rate. In one example, A learning algorithm (see below) adjusts the initial attribute score assignment based on a hashing algorithm's security strength via its adoption rate according to a formula that captures the principle that low growth rates indicate either outdated (very) weak algorithms, or new and sparsely adopted ones, while high growth rates indicate (very) strong hashing algorithms. Assuming such survey was performed in 2012, the assigned values could be:

MD2: very weak algorithm; very low adoption rate
MD5: weak algorithm; low adoption rate
SHA-1: acceptable algorithm strength; high adoption rate
SHA-256: strong algorithm; low adoption rate
SHA-512: very strong algorithm; very low adoption rate By continuously repeating the survey, the learning algorithm adjusts the hashing algorithm's attribute score assignment to reflect shifts in the hashing algorithm's growth rate and occasional updates to its security strength rating. The same evaluation in 2015, with the support of SHA-256 by public certification authorities (CAs) and introduction and approval of new algorithms, e.g., SHA-3 by NIST, might result in:

MD2: very weak algorithm; very low adoption rate
MD5: very weak algorithm; very low adoption rate
SHA-1: barely acceptable algorithm strength; medium adoption rate
SHA-256: strong algorithm; high adoption rate
SHA-512: strong algorithm; low adoption rate
SHA-3: very strong algorithm; initial security strength assignment Assignments of attribute scores to a property and/or attribute can be automatically adjusted to reflect changes in the security landscape over time, as illustrated in process 500 of FIG. 5. The initial assignment of the attribute scores $\sigma^i$ can be updated to $\sigma^n$ in response to incoming information via the relationship:

$$\sigma^n = f(\sigma^i, \vec{\Phi})$$

where the (one or more dimensional) update vector $\vec{\Phi}$ is learned from incoming information, and $f$ is a function that aggregates the initial attribute score assignments and the update vector to produce a new attribute score.

As illustrated in FIG. 5, optional operation 504 can select an appropriate model for the adjustment vector $\vec{\Phi}$. In one embodiment, the attribute score adjustment is made with an update vector $\vec{\Phi}$ that assigns a value in the interval [0,1] to doubling times (how long it takes for the population with a particular feature to double in size) derived from an exponential model of the growth of a specified subset of certificates over time (see FIG. 6), and an aggregating function $f$ taken to be the geometric mean. In this embodiment, $\vec{\Phi}$ compares the doubling time of a subset of certificates ($t_{subset}$) to the doubling time of all certificates ($t_{all\_certificates}$), and assigns a value between 0 and 0.5 to certificate subsets with a doubling time longer than the overall certificate doubling time, and a value between 0.5 and 1 to certificates with a doubling time shorter than it:

$$\vec{\Phi}(t_{subset}) = 2^{-\left(\frac{t_{subset}}{t_{all\_certificates}}\right)}$$

and the aggregating function $f$ is the geometric mean defined:

$$f(x_1, x_2, \ldots, x_n) = \left(\prod_{i=1}^{n} x_i\right)^{1/n}$$

Figure 6:
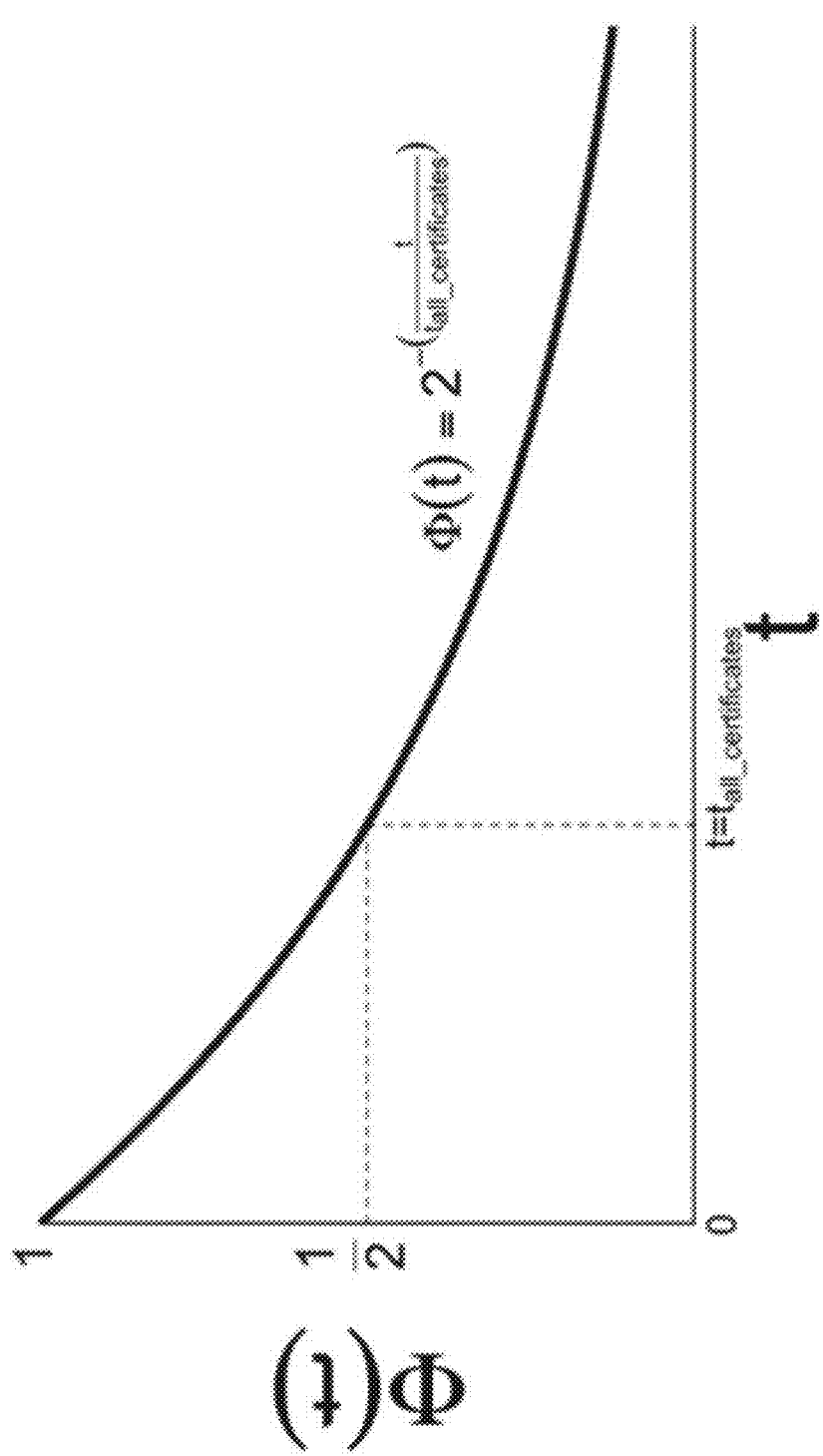
FIG. 6 illustrates a representative function for calculating an update vector.

FIG. 6 illustrates the update vector function $\vec{\Phi}$.

In one embodiment, the attribute score adjustment is calculated for $A_{2,P_3}$ the hashing part of the certificate's signature algorithm for property $P_3$. The initial property score is assigned to a certificate based on the NIST security strength assignment of its hashing algorithm as described above. The property score is then updated in response to updated information that reflects changes in the impact the algorithm is having on the community, as quantified by the algorithm adoption rate. This adoption rate is learned from periodic large-scale scans of certificates (e.g., operation 206, FIG. 2). An exponential model is fitted to the cumulative number of certificates employing a particular hashing algorithm as a function of certificate validity start date. The exponent of the model yields a measure of the algorithm adoption rate (operation 506). This adoption rate may then be used in the function $\vec{\Phi}$ to calculate the update vector (operation 508). The update vector is then combined with the initial value to calculate the new score (operation 510). For example, we may observe that in 2015, the number of hashing algorithms with a NIST security strength assignment of 128 is doubling every 2 years $$(t_{A_{2_3}} = 2),$$

the number of algorithms given a strength of 256 is doubling every 4 years $$(t_{A_{2_5}} = 4),$$

and the time taken for the total number of certificates to double is 5 year ($t_{all\_certificates}$=5). The initial values of the attribute scores for certificates with hashing algorithms assigned NIST security scores of 128 and 256 would be updated in response to the empirical doubling times via (operation 508):

$$\vec{\Phi}_{A_{2_3},P_3} = 2^{-\left(\frac{t_{A_{2_3}}}{t_{all\_certificates}}\right)} = 2^{-\left(\frac{2\ years}{5\ years}\right)} \cong 0.76,$$

$$\vec{\Phi}_{A_{2_5},P_3} = 2^{-\left(\frac{t_{A_{2_5}}}{t_{all\_certificates}}\right)} = 2^{-\left(\frac{4\ years}{5\ years}\right)} \cong 0.57,$$

so that for the NIST 128 algorithms (operation 510):

$$\sigma^n_{A_{2_3},P_3} = f\left(\sigma^i_{A_{2_3},P_3}, \vec{\Phi}_{A_{2_3},P_3}\right) = \text{geometric\_mean}\left(\sigma^i_{A_{2_3},P_3}, \vec{\Phi}_{A_{2_3},P_3}\right) = \left(\prod \left(\sigma^i_{A_{2_3},P_3}, \vec{\Phi}_{A_{2_3},P_3}\right)\right)^{1/2} = (0.8 \cdot 0.76)^{1/2} \cong 0.78$$

and for the NIST 256 algorithms (operation 510):

$$\sigma^n_{A_{2_5},P_3} = f\left(\sigma^i_{A_{2_5},P_3}, \vec{\Phi}_{A_{2_5},P_3}\right) = \text{geometric\_mean}\left(\sigma^i_{A_{2_5},P_3}, \vec{\Phi}_{A_{2_5},P_3}\right) = \left(\prod \left(\sigma^i_{A_{2_5},P_3}, \vec{\Phi}_{A_{2_5},P_3}\right)\right)^{1/2} = (1 \cdot 0.57)^{1/2} \cong 0.75$$

In this example the algorithms with a NIST security strength assignment of 256, while given an initial score greater than the NIST 128 algorithms, are nevertheless given a lower final score than the NIST 128 algorithms because of their slower adoption rate and lower impact on the community in 2015.

We could potentially see a reversal of this evaluation in 2020 if we observe that the number of hashing algorithms with a NIST security strength assignment of 128 is doubling every 4 years $$(t_{A_{2_3}} = 4),$$

the NIST 256 algorithms are doubling every 1.5 years $$(t_{A_{2_5}} = 1.5),$$

and the total number of certificates is doubling every 4.5 years ($t_{all\_certificates}$=4.5). The update vectors would be (operation 508):

$$\vec{\Phi}_{A_{2_3},P_3} = 2^{-\left(\frac{t_{A_{2_3}}}{t_{all\_certificates}}\right)} = 2^{-\left(\frac{4\ years}{4.5\ years}\right)} \cong 0.54,$$

$$\vec{\Phi}_{A_{2_5},P_3} = 2^{-\left(\frac{t_{A_{2_5}}}{t_{all\_certificates}}\right)} = 2^{-\left(\frac{1.5\ years}{4.5\ years}\right)} \cong 0.79,$$

so that for the NIST 128 algorithms (operation 510):

$$\sigma^n_{A_{2_3},P_3} = f\left(\sigma^i_{A_{2_3},P_3}, \vec{\Phi}_{A_{2_3},P_3}\right) = \text{geometric\_mean}\left(\sigma^i_{A_{2_3},P_3}, \vec{\Phi}_{A_{2_3},P_3}\right) = \left(\prod \left(\sigma^i_{A_{2_3},P_3}, \vec{\Phi}_{A_{2_3},P_3}\right)\right)^{1/2} = (0.8 \cdot 0.54)^{1/2} \cong 0.66$$

and for the NIST 256 algorithms (operation 510):

$$\sigma^n_{A_{25},P_3} = f\left(\sigma^i_{A_{25},P_3}, \vec{\Phi}_{A_{25},P_3}\right) = \text{geometric\_mean}\left(\sigma^i_{A_{25},P_3}, \vec{\Phi}_{A_{25},P_3}\right) = \left(\prod \left(\sigma^i_{A_{25},P_3}, \vec{\Phi}_{A_{25},P_3}\right)\right)^{1/2} = (1 \cdot 0.79)^{1/2} \cong 0.89$$

The NIST 256 algorithms are now given a much higher score than the NIST 128 algorithms; a reflection of both the faster adoption rate and the higher initial value of the attribute score for the NIST 256 algorithms. In general, this approach can be applied to any attribute score associated with a property of certificates that may improve or be updated over time.

In this example, a particular update function was identified to adjust a parameter that conforms well, within a fixed time window, to an exponential model. Different models may be used to adjust other properties and/or attributes over time that are better described with a non-exponential model, resulting in selection of a different model as part of operation 504.

If update vector identified in operation 208 would result in updated scores, then the "Yes" branch is taken out of operation 210 and the scores are recalculated in operation 212. Operation 212 is performed according to the discussion around setting the initial scores as disclosed above. In other words, the scores for various attributes are calculated and combined according to the functions disclosed above to yield property scores for each property. The property scores are then aggregated according to the weighted sum disclosed above to yield an overall score. If further aggregation is desired (across a system, cluster of systems, cryptographic material holder, subsidiary, company, etc.), then the further aggregation is performed.

Statistical Sampling and Geographic/Contextual Adjustments

The overall score σ, calculated as described in the previous paragraphs, can in addition be further affected by a statistical analysis, by applying dynamic pattern recognition and by evaluating additional context-sensitive data. In one embodiment, statistical anomaly probing is part of operation 208 (illustrated as process 502 of FIG. 5) and examines the likelihood of the specific occurrence of the cryptographic material and/or the likelihood of specific context configuration for the cryptographic material when compared to a test group of similar samples.

Operation 512 of FIG. 5 selects the context-sensitive factors and attributes that will be used to calculate the security anomaly score. In one embodiment the geo-location context of a collected X.509 TLS server certificate might be evaluated as part of the anomaly probing. The following example helps explain how this arises and the impact it can have. Different national regulatory bodies recommend the use of otherwise less commonly applied cryptographic primitives, e.g., the Russian GOST specifications R. 34.10, 34.11, etc. For application of the GOST specifications in X.509 certificates see RFC 4491. Which regulatory body applies often depends on the geo-location context of the certificate. Using the GOST specifications as a representative example, in one embodiment, X.509 TLS server certificates whose signature has been produced with such a GOST-algorithm might be further examined in regards to the certificate's ownership—specifically the country code part of the certificate's subject distinguished name—and IP address provenience, i.e., the geo-location metadata for the IP address for which the certificate has been employed.

Given a 2×2 contingency table counting the number of certificates that do or do not use a GOST signature algorithm, and that are located inside or outside of Russia, we can assign an anomaly score Ω to a certificate that reflects the interaction between the use of the GOST signature algorithm and the certificate's geo-location. For example, in a collection of observed certificates the abundances of the possible combinations of these properties (relative to the total number of certificates) may be as given in the table below:

TABLE 3

Example X.509 Certificates Using GOST Signature Algorithms

|  | Inside Russia | Outside of Russia |
| --- | --- | --- |
| Uses GOST signature algorithm | 0.02 | 0.005 |
| Does not use GOST signature algorithm | 0.05 | 0.925 | which we write:

$$M = \begin{pmatrix} 0.02 & 0.005 \\ 0.05 & 0.925 \end{pmatrix}$$

The anomaly score for a certificate that uses the GOST signature algorithm, and is found outside of Russia, would be calculated on the basis of the conditional probability that the signature algorithm is "GOST" given that the geographic region is not Russia (operation 514). This probability is given by:

$$p = p(GOST \mid \text{Outside\_Russia}) = \frac{M_{1,2}}{\sum_{i=1}^{2} M_{i,2}} = \frac{0.005}{0.005 + 0.925} \cong 0.0054$$

Figure 7:
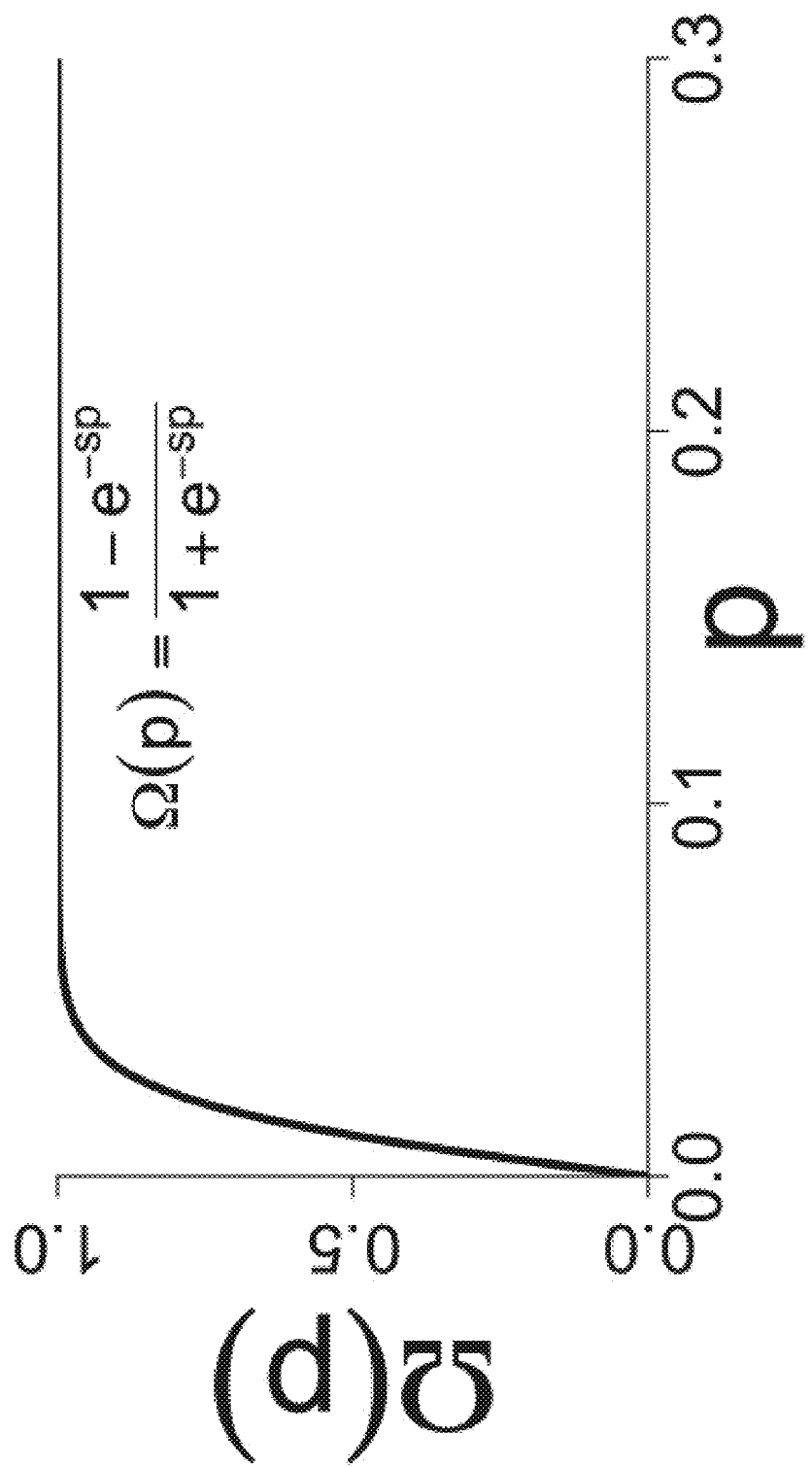
FIG. 7 illustrates a representative function for calculating an anomaly score.

In embodiments disclosed herein, the anomaly score is selected to remain near 1 except in the case of a very anomalous certificate. In other words, applying this approach small values of the conditional probability described above identify anomalous certificates, but differences between large and middling values of this probability are unlikely to indicate a meaningful difference between certificates. For this reason in one embodiment the anomaly score is calculated (operation 516) from the conditional probability via a sigmoidal function that exaggerates differences between low conditional probabilities, but is largely insensitive to differences between probabilities in the mid and high range:

$$\Omega(p) = \frac{1 - e^{-sp}}{1 + e^{-sp}}$$

where s is parameter that controls the range of probabilities to which Ω is sensitive. In a representative embodiment, a suitable value for s would be 100, chosen to tune the range of probabilities to which the anomaly scoring function is sensitive. FIG. 7 plots Ω(p) for s=100. Using this function, the anomaly score for a certificate found using the GOST signature algorithm outside of Russia (the p(GOST|Outside$_{Russia}$)≈0.0054 from above) would be given by (operation 516):

$$\Omega(p(GOST \mid \text{Outside\_Russia})) = \frac{1 - e^{100*0.0054}}{1 + e^{-100*0.0054}} \cong 0.26$$

On the other hand, for a GOST certificate that was found in Russia, $\Omega$ would be given by (operations 514 and 516):

$$p = p(GOST \mid \text{Inside\_Russia}) = \frac{M_{1,1}}{\sum_{i=1}^{2} M_{i,1}} = \frac{0.02}{0.02 + 0.05} \cong 0.286$$

$$\Omega(p(GOST \mid \text{Inside\_Russia})) = \frac{1 - e^{100*0.286}}{1 + e^{-100*0.286}} \cong 1$$

Thus $\Omega$ assigns a score very close to 1 to the certificate with the unsurprising location within Russia, but gives a significantly smaller value to the anomalous certificate that uses the GOST signature algorithm outside of Russia.

The anomaly function, the initial security reliance score, and debasing constant $\Delta$, if any of the debasing conditions are met, are used to determine an adjusted security reliance score through the equation at the beginning of the disclosure:

$$\sigma := \begin{cases} \Delta, & \text{if debasing condition is met} \\ \Psi\left(\sum_{i=0}^{n} \sigma_{P_i} \cdot W_{P_i}, \Omega\right), & \text{otherwise} \end{cases}$$

As explained above, the mapping function, $\Psi$, combines the security reliance score, and the anomaly score to adjust the security reliance score for the information contained in the anomaly score. In one embodiment, the function, $\Psi$, selects the minimum between the security reliance score and the anomaly score. Thus:

$$\Psi\left(\sum_{i=0}^{n} \sigma_{P_i} \cdot W_{P_i}, \Omega\right) = \min\left(\sum_{i=0}^{n} \sigma_{P_i} \cdot W_{P_i}, \Omega\right)$$

In another embodiment, the function, $\Psi$, calculates the mean of its inputs. Thus:

$$\Psi\left(\sum_{i=0}^{n} \sigma_{P_i} \cdot W_{P_i}, \Omega\right) = \frac{1}{2}\left(\left(\sum_{i=0}^{n} \sigma_{P_i} \cdot W_{P_i}\right) + \Omega\right)$$

Once the value for any $\Omega$ is calculated (operation 502), the "yes" branch out of operation 210 is also triggered and the scores recalculated in operation 212 and stored in operation 214 as previously described.

If no changes are detected as part of operation 210, the "no" branch is taken and the system can wait until new information is collected that could impact the scores.

Other Uses for Survey Data

The information collected as part of survey data collection operation 206 can also be used for other (optional) purposes such as generate survey reports (operation 216 discussed below) and identifying new attributes/properties that should be included as part of the scoring system (operation 218).

Identification of new attributes/properties can occur based on analysis of the collected data (operation 206). For example, the ongoing data collection may discover an X.509 TLS server certificate that employs a new and previously unseen signature algorithm. In one embodiment, the attribute score programmatically associated with the new signature algorithm would be set to a default value of 0.5. In subsequent data collections, it would become possible to estimate the adoption rate and doubling time for the new algorithm. If the new algorithm begins to be highly adopted, this will be reflected in the update vector and lead to the adjustment of the corresponding attribute score toward a higher value in indication of the high security impact the algorithm is having. If, on the other hand, the algorithm does not gain widespread adoption, the corresponding attribute score will drop in reflection of the low impact of the new signature algorithm.

Once new attributes and/or properties have been identified as part of operation 218, the "yes" branch is taken out of operation 220 and initial values for the attributes are set and the initial scores calculated. As indicated previously, in some embodiments, attribute scores for particular properties are calculated in different ways (i.e., using different functions) for different properties (e.g., not every embodiment uses the same functions to aggregate property scores for all properties). Examples of these functions have been discussed above. If the system identifies new attribute(s), functionality to handle the new attribute(s) can be added to the system to calculate the new scores/property scores if desired. Periodically, properties are re-defined and/or created by aggregating different existing and/or new attributes. Likewise, new implementations of cryptographic primitives are integrated into the corresponding security property's attribute by a manual initial security strength assignment, e.g., NIST's finalization of the cryptographic hashing standard SHA-3.

Although operation 218 and operation 220 are specified in terms of "new" attributes and/or properties, some embodiments also identify whether existing attributes should be removed. Additionally, or alternatively, attributes that no longer apply can be debased using debasing conditions, as previously described above.

Use of the Security Reliance Score

The security reliance score, or a subset of its property or attribute scores in a variety of particular combinations, can be aggregated and further customized to target the specific landscape of an organization, such as depicted as part of operation 216 and as described above (e.g., further aggregation of the security reliance scores).

Many organizations lack the ability to identify even the most egregious cryptographic key-related vulnerabilities that need to be addressed. Evaluation is accomplished in some embodiments by calculating a security reliance score, as indicated above. The calculated scores allow for an ordering by worst configurations encountered for the network services provided by an organization or partitions of it.

Figure 8:
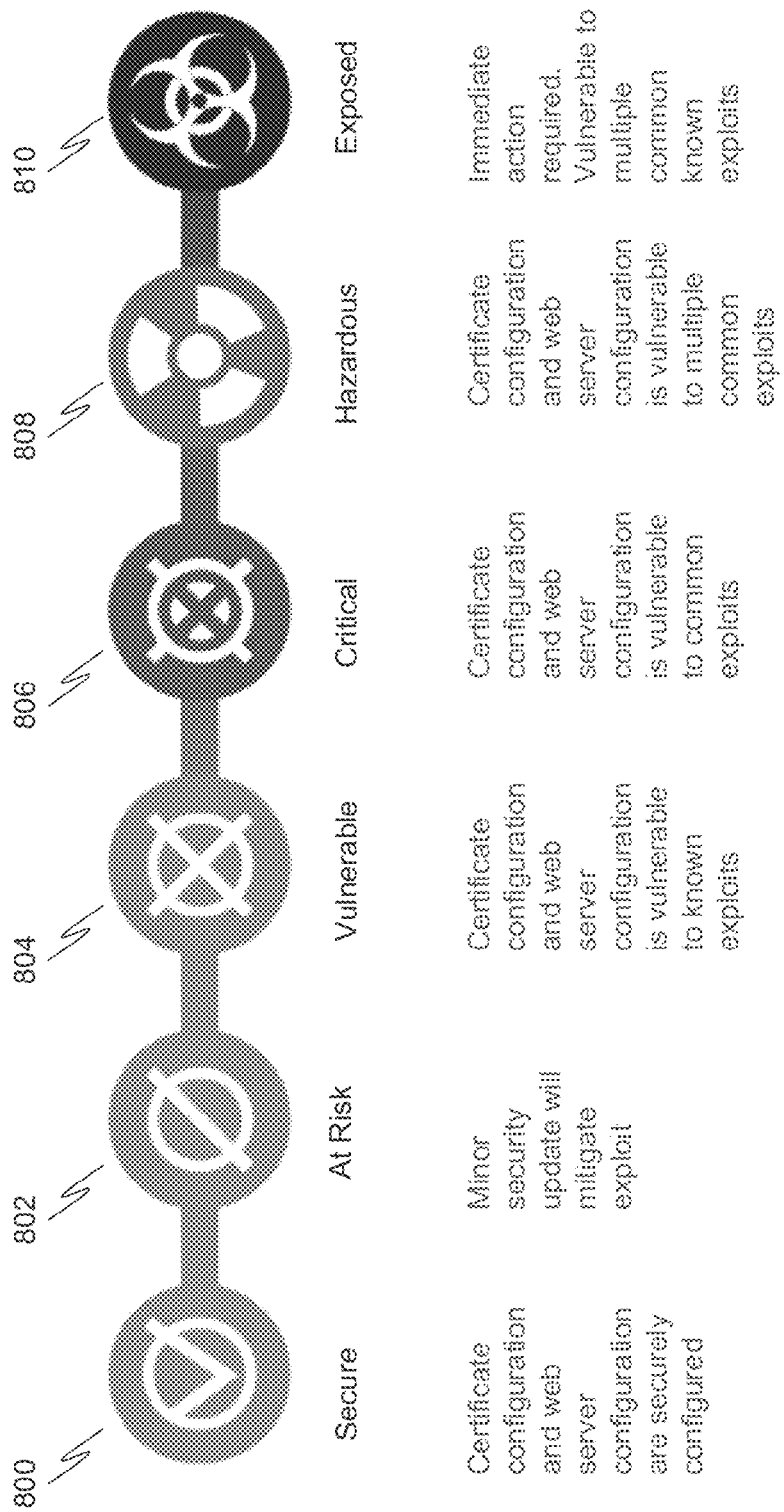
FIG. 8 illustrates a representative vulnerability scale.

FIG. 8 illustrates how the security reliance score, or aggregated security reliance scores (i.e., aggregated across a system, business line, enterprise and/or business vertical) can be used to calculate a representative vulnerability scale. In this discussion below, security reliance score will be used although it is understood that the same disclosure applies equally to aggregated security reliance scores. Such a vulnerability scale can be derived from a security reliance score by placing the scores on a relative continuum, and setting thresholds for the various "levels" of vulnerability in order to "bucketize" a particular security reliance score into a particular vulnerability level. Additionally, or alternatively, specific causes may call for a particular place on the vulnerability scale. Thus, examining the attribute, property and overall scores and identifying the aspects that are causing an attribute score may give rise to a particular placement. For example, if the $P_0$ (TLS configuration) score described above is particularly low, an examination may reveal that the reason is that attribute $A_{2,C_0}$ (Renegotiation) as the TLS Insecure Renegotiation enabled (thus giving it a score of only 0.3). This factor can then be identified as a cause of the low score.

Such an examination also yields suggestions on how to improve the scores and can further identify changes that will have the biggest impact. Thus, the examination may yield information that can be presented to a system administrator, or other user of the system, to help them diagnose and correct security issues.

The representative vulnerability scale in FIG. 8 has six categories, indicating increasing levels of vulnerability. These can be presented in various ways including having symbols (such as those illustrated as part of levels 800, 802, 804, 806, 808, and 810) and/or color coding to visually convey a sense of urgency associated with increasing levels of vulnerability. The various illustrated levels include:
 1. Secure 800: The entities' certificate configuration and network service configuration are secure.
 2. At Risk 802: The entities' certificate configuration or network service configuration does not follow security best practices and places the organization at risk of being exploited.
 3. Vulnerable 804: The entities' certificate configuration or network service configuration is vulnerable to known exploits.
 4. Critical 806: The entities' certificate configuration or network service configuration is vulnerable to common exploits.
 5. Hazardous 808: The entities' certificate configuration or network service configuration is vulnerable to several common exploits.
 6. Exposed 810: The entities' certificate configuration or network service configuration is exposed to several, severe common exploits, action should be taken immediately.

Some embodiments comprise a model 'calculator' or 'evaluator' that dynamically highlights how specific TLS configuration settings can improve or decrease ones overall TLS security posture. Such an interactive tool can utilize stored security reliance scores (overall, property, attribute, aggregated, and so forth) to allow a user to interactively evaluate and investigate scores (at various levels), aggregate and drill into scores and their components, evaluate underlying causes for the various security reliance scores and associated vulnerability levels, and investigate various configurations.

By presenting an interactive tool, that allows trying out different configuration settings, a customer is enabled to decide how to increase his overall security rating by focusing on settings with the biggest impact.

In addition to an interactive tool, embodiments may automatically recommend settings that, if changed, will have an impact on the overall security rating. Such recommendations can be based, for example, on the analysis above (e.g., identifying settings that have the biggest contribution toward an attribute score and then identifying which values that, if changed, will have the biggest impact on an attribute score).

Security scoring results for organizations, as described above, can be further grouped and aggregated by standard industry hierarchies, e.g., MSCI's Global Industry Classification Standard. Such a scoring aggregation can allow entities to compare their achieved security score with peers in the same industry area.

Figure 9:
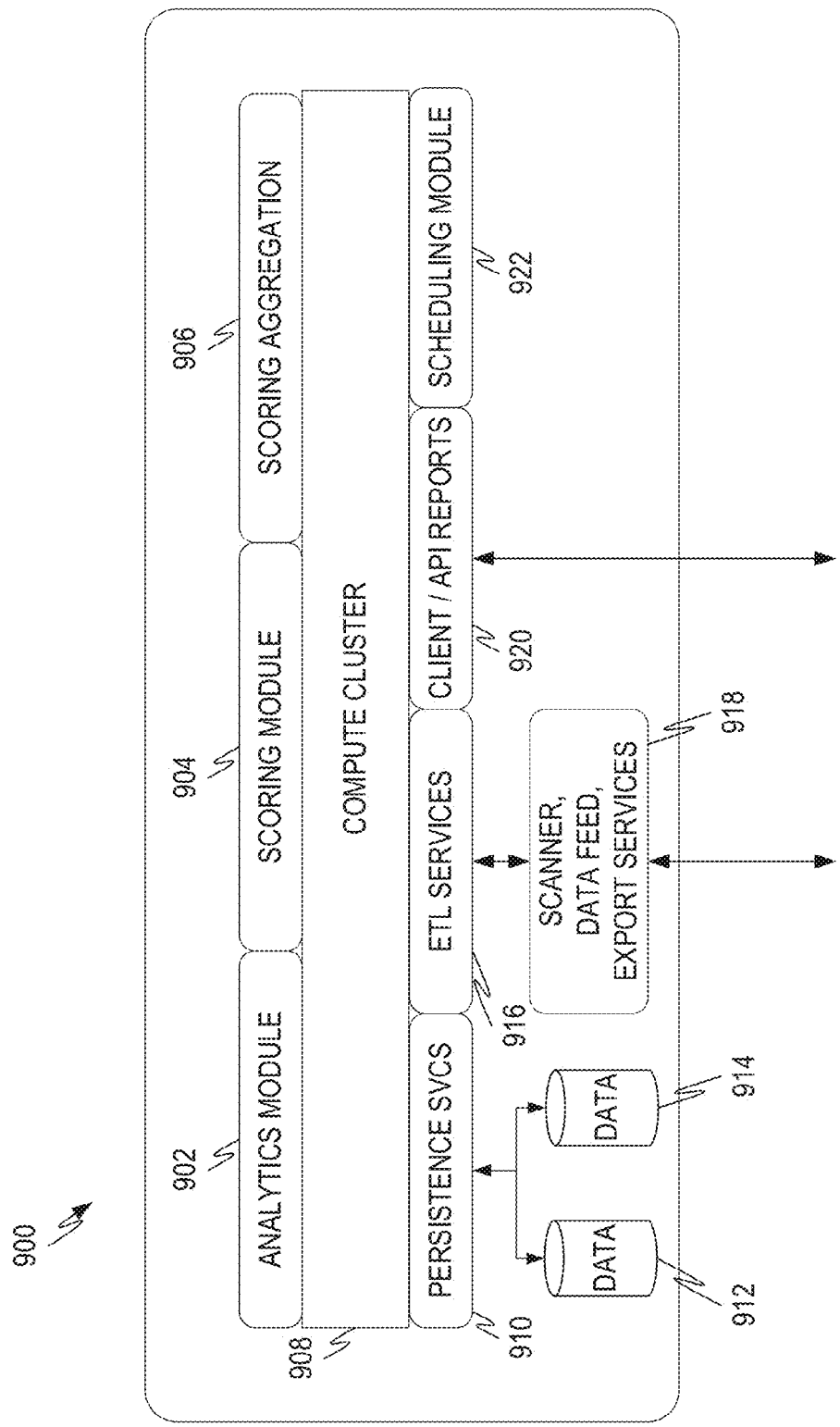
FIG. 9 illustrates a representative software architecture.

FIG. 9 illustrates an example logical system architecture 900. Such a logical architecture comprises various modules, such as analytics module 902, scoring module 904 and scoring aggregation module 906 implemented as part of a compute cluster 908 or other machine (not shown).

Analytics module 902, for example, performs various operations such as the learning process, statistical sampling and other analytic aspects described above. Scoring module 804, for example, calculates sub-scores as described above and scoring aggregation module 806 aggregates individual scores into those described elsewhere. Other modules may include reporting modules, modules to calculate new factors, and so forth.

Computer cluster 808 represents a location to implement the modules and logic described above. It can be, for example, the systems illustrated in FIG. 3 (e.g., 308) and/or FIG. 4 (e.g., 402).

Also illustrated are persistence services module 910 which can store data in various databases such as data store 912 and data store 914. Two data stores are illustrated in order to represent that multiple levels of storage may be maintained, such as more immediate storage and more archival storage. ETL (Export Transform Load) Services module, in conjunction with specified data sources (such as the illustrated scanners, data feeds, export services 918) provide the ability to get data into or out of the system in various ways. The ETL may be used, for example, for bulk export/import of information. Smaller amounts of information can use the client/API Reports interface 920. The system may also provide an API or other mechanism for a client or other system to access the functionality provided by the system (920). Such would be used, for example, by the described interactive tool or by another system to produce reports and so forth. The scheduling module provides scheduling services so that surveys, data gathering and so forth can be performed on a periodic basis according to a designated schedule. Other modules may also be implemented, although they are not specifically illustrated in FIG. 9.

Modules, Components and Logic

Certain embodiments are described herein as including logic or a number of components, modules, or mechanisms. Modules may constitute either software modules (i.e., code embodied on a machine-readable medium) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein are at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures may be employed. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
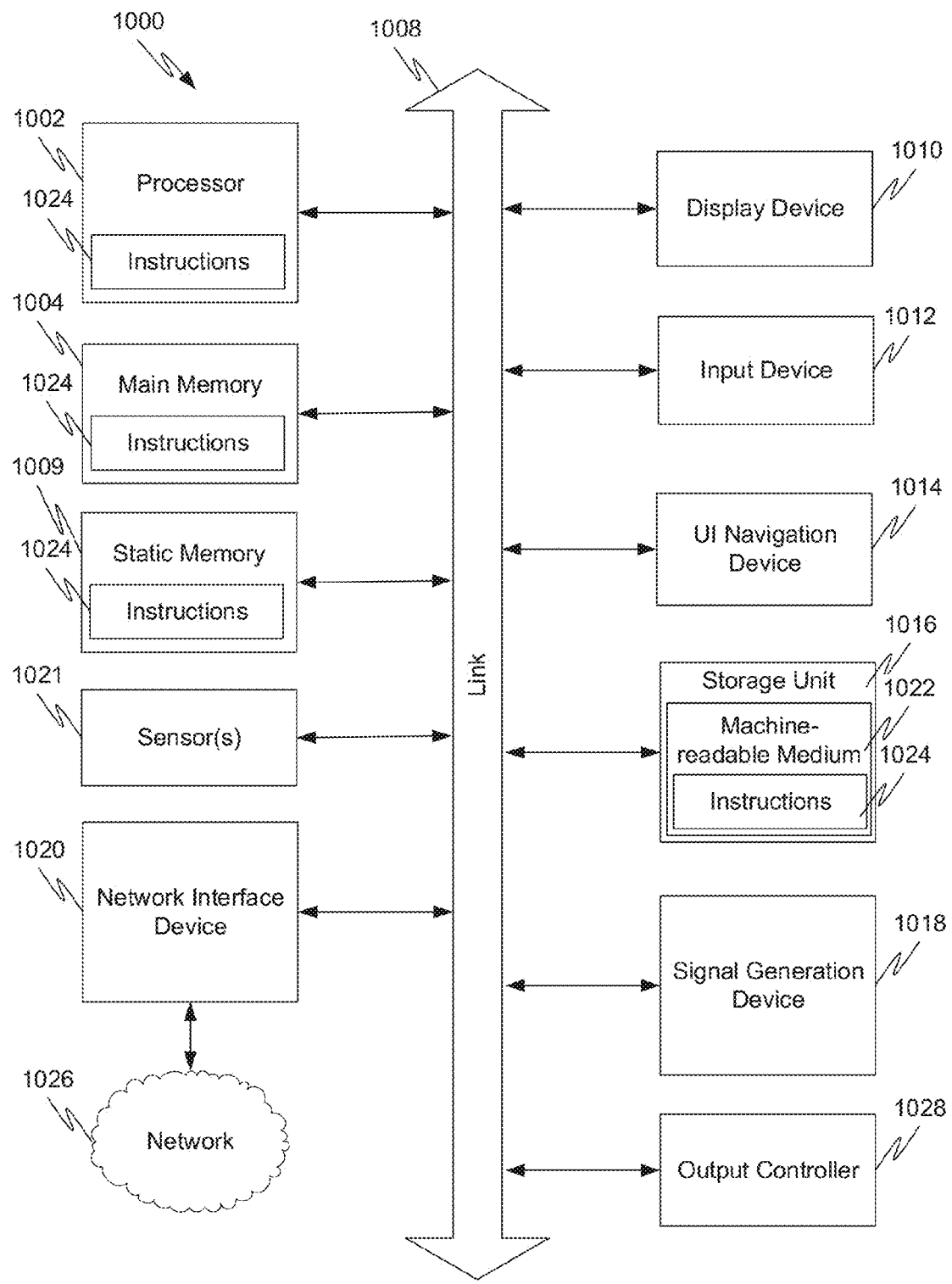
FIG. 10 is a block diagram of a machine in the example form of a processing system within which may be executed a set of instructions for causing the machine to perform any one or more of the methodologies discussed herein including the functions, systems and flow diagrams thereof.

FIG. 10 is a block diagram of a machine in the example form of a processing system within which may be executed a set of instructions for causing the machine to perform any one or more of the methodologies discussed herein including the functions, systems and flow diagrams thereof.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a smart phone, a tablet, a wearable device (e.g., a smart watch or smart glasses), a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the machine 1000 includes at least one processor 1002 (e.g., a central processing unit (CPU), a graphics processing unit (GPU), advanced processing unit (APU), or combinations thereof), a main memory 1004 and static memory 1006, which communicate with each other via bus 1008. The machine 1000 may further include graphics display unit 1010 (e.g., a plasma display, a liquid crystal display (LCD), a cathode ray tube (CRT), and so forth). The machine 500 also includes an alphanumeric input device 1012 (e.g., a keyboard, touch screen, and so forth), a user interface (UI) navigation device 1014 (e.g., a mouse, trackball, touch device, and so forth), a storage unit 1016, a signal generation device 1028 (e.g., a speaker), sensor(s) 1021 (e.g., global positioning sensor, accelerometer(s), microphone(s), camera(s), and so forth) and a network interface device 1020.

Machine-Readable Medium

The storage unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004, the static memory 1009, and/or within the processor 1002 during execution thereof by the machine 1000. The main memory 1004, the static memory 1009 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The term machine-readable medium specifically excludes non-statutory signals per se.

Transmission Medium

The instructions 1024 may further be transmitted or received over a communications network 1026 using a transmission medium. The instructions 1024 may be transmitted using the network interface device 520 and any one of a number of well-known transfer protocols (e.g., HTTP). Transmission medium encompasses mechanisms by which the instructions 1024 are transmitted, such as communication networks. Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer implemented method for scoring the security reliance of cryptographic material comprising:
   identify a plurality of security properties relevant to cryptographic material of a cryptographic key certificate, each of the plurality of security properties having a plurality of attributes; assigning an initial attribute score to each of the attributes;
   calculating, by one or more computers, a property score for each of the plurality of properties based on the initial attribute score for the corresponding plurality of attributes and an aggregation function selected from a plurality of aggregation functions;
   aggregating, by the one or more computers, the corresponding property score for each of the plurality of properties to produce a security reliance score for the cryptographic material;

calculating, by the one or more computers, an anomaly score for the cryptographic material based on statistical sampling of survey data, obtained via a network from a plurality of systems, comprising at least one context factor for a population of cryptographic material;

adjusting, by the one or more computers, the security reliance score based on the anomaly score based on a mapping function that takes as an input the security reliance score and the anomaly score; and presenting the adjusted security reliance score as part of a security evaluation.

2. The method of claim 1, further comprising:

calculating at least one parameter from the survey data for a model that captures changes of at least one security attribute over time;

calculating an update vector using the calculated parameters and the survey data to identify a change in at least one security attribute over time;

updating a score for the at least one security attribute using the update vector and an existing score for the at least one security attribute, thereby adjusting the existing score for the at least one security attribute for the change in the at least one security attribute over time.

3. The method of claim 2 further comprising:

recalculating a property score based on the updated score for the at least one security attribute; and reaggregating the property scores for each of the plurality of properties to produce an updated security reliance score for the cryptographic material.

4. The method of claim 1 wherein the at least one context factor is a geo-location associated with the cryptographic material.

5. The method of claim 4 wherein the anomaly score is based upon a probability that certificates within the geo-location adhere to a given configuration.

6. The method of claim 1 further comprising:

aggregating adjusted security reliance scores across a system, a business line, enterprise or a business vertical to obtain an aggregated security reliance score;

comparing the aggregated security score to peer aggregated security scores and presenting a result of the comparison to convey relative security reliance.

7. The method of claim 1, wherein the plurality of aggregation functions comprises:

a weighted sum function;

a table lookup; and a combination of the lookup table and the weighted sum.

8. The method of claim 1, wherein the survey data comprises data collected over time to allow evaluation of how the data changes over time.

9. A machine-readable device having executable instructions encoded thereon, which, when executed by at least one processor of a machine, cause the machine to perform operations comprising:

identify a plurality of security properties relevant to cryptographic material of a cryptographic key certificate, each of the plurality of security properties having a plurality of attributes;

assign an initial attribute score to each of the attributes;

calculate a property score for each of the plurality of properties based on the initial attribute score for the corresponding plurality of attributes and an aggregation function selected from a plurality of aggregation functions;

aggregate the corresponding property score for each of the plurality of properties to produce a security reliance score for the cryptographic material;

calculate at least one parameter from survey data, obtained via a network from a plurality of systems, for a model that reflects changes of at least one security attribute over time;

calculate an update vector using the calculated at least one parameter and the survey data to identify a change in at least one security attribute over time;

update an attribute score for the at least one security attribute using the update vector and an existing score for the at least one security attribute, thereby adjusting the existing score for the at least one security attribute for the change in the at least one security attribute over time;

re-aggregate a corresponding property score based on the updated attribute score;

re-aggregate the corresponding property score for each of the plurality of properties to produce an updated security reliance score for the cryptographic material; and present the updated security reliance score as part of a security evaluation.

10. The machine-readable medium of claim 9, wherein the operations further comprise:

calculate an anomaly score for the cryptographic material based on statistical sampling of survey data comprising at least one context factor for a population of cryptographic material;

adjust the security reliance score based on the anomaly score based on a mapping function that takes as an input the security reliance score and the anomaly score.

11. The machine-readable medium of claim 9 wherein the operations further comprise:

calculate an anomaly score for the cryptographic material based on statistical sampling of survey data comprising at least one context factor for a population of cryptographic material;

adjust the updated security reliance score based on the anomaly score based on a mapping function that takes as an input the security reliance score and the anomaly score.

12. The machine-readable medium of claim 11 wherein the at least one context factor is a geo-location associated with the cryptographic material.

13. The machine-readable medium of claim 12 wherein the anomaly score is based upon a probability that certificates within the geo-location adhere to a given configuration.

14. The machine-readable medium of claim 9 wherein the operations further comprise:

aggregating updated security reliance scores across a system, a business line, enterprise or a business vertical to obtain an aggregated security reliance score;

comparing the aggregated security score to peer aggregated security scores and presenting a result of the comparison to convey relative security reliance.

15. The machine-readable medium of claim 9, wherein the plurality of aggregation functions comprises:

a weighted sum function;

a table lookup; and a combination of the lookup table and the weighted sum.

16. The machine-readable medium of claim 9, wherein the survey data comprises data collected over time to allow evaluation of how the data changes over time.

17. A system comprising:

a hardware processor and executable instructions accessible on a machine-readable medium that, when executed, cause the processor to perform operations comprising:

identify a plurality of security properties relevant to cryptographic material of a cryptographic key certificate, each of the plurality of security properties having a plurality of attributes; assign an initial attribute score to each of the attributes;

calculate a property score for each of the plurality of properties based on the initial attribute score for the corresponding plurality of attributes and an aggregation function selected from a plurality of aggregation functions;

aggregate the corresponding property score for each of the plurality of properties to produce a security reliance score for the cryptographic material;

calculate an anomaly score for the cryptographic material based on statistical sampling of survey data, obtained via a network from a plurality of systems, comprising at least one context factor for a population of cryptographic material;

adjust the security reliance score based on the anomaly score based on a mapping function that takes as an input the security reliance score and the anomaly score; and present the adjusted security reliance score as part of a security evaluation.

18. The system of claim 17, wherein the operations further comprise:

calculate at least one parameter from the survey data for a model that captures changes of at least one security attribute over time;

calculate an update vector using the calculated parameters and the survey data to identify a change in at least one security attribute over time;

update a score for the at least one security attribute using the update vector and an existing score for the at least one security attribute, thereby adjusting the existing score for the at least one security attribute for the change in the at least one security attribute over time.

19. The system of claim 18 wherein the operations further comprise:

recalculate a property score based on the updated score for the at least one security attribute; and re-aggregate the property scores for each of the plurality of properties to produce an updated security reliance score for the cryptographic material.

20. The system of claim 18, wherein the survey data comprises data collected over time to allow evaluation of how the data changes over time.

* * * * *

UNITED STATES PATENT AND TRADEMARK OFFICE
CERTIFICATE OF CORRECTION

PATENT NO. : 9,876,635 B2
APPLICATION NO. : 14/802502
DATED : January 23, 2018
INVENTOR(S) : Bektchiev et al.

Page 1 of 1

It is certified that error appears in the above-identified patent and that said Letters Patent is hereby corrected as shown below:

In the Specification

In Column 5, Line 46, delete "renegotiations" and insert --renegotiation-- therefor In Column 19, Line 63, delete "year" and insert --years-- therefor In Column 22, Line 60, delete "Q" and insert --$\Omega$-- therefor Signed and Sealed this
Eleventh Day of June, 2019

Andrei Iancu
*Director of the United States Patent and Trademark Office*